(12) United States Patent
Sugiura et al.

(10) Patent No.: US 7,196,492 B2
(45) Date of Patent: Mar. 27, 2007

(54) POWER SUPPLY APPARATUS INCLUDING FUEL CELL AND CAPACITOR, AND OPERATION METHOD THEREOF

(75) Inventors: Hiroshi Sugiura, Chigasaki (JP); Tetsuhiro Ishikawa, Aichi-ken (JP); Shoichi Sasaki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 541 days.

(21) Appl. No.: 10/322,688

(22) Filed: Dec. 19, 2002

(65) Prior Publication Data
US 2003/0118876 A1    Jun. 26, 2003

(30) Foreign Application Priority Data
Dec. 19, 2001  (JP) ............................. 2001-385705
Apr. 24, 2002  (JP) ............................. 2002-122115

(51) Int. Cl.
*H01M 10/46* (2006.01)
(52) U.S. Cl. ...................................................... 320/101
(58) Field of Classification Search ................ 320/101, 320/103, 104, 132, 149, 166; 429/12, 21, 429/22
See application file for complete search history.

(56) References Cited

U.S. PATENT DOCUMENTS 5,334,463 A * 8/1994 Tajima et al. .................. 429/9
5,929,594 A * 7/1999 Nonobe et al. ............. 320/104
6,380,638 B1 * 4/2002 Bitsche et al. .............. 320/147

FOREIGN PATENT DOCUMENTS

| DE | 197 37 406 C2 | 3/1998 |
|---|---|---|
| DE | 197 24 712 A1 | 12/1998 |
| DE | 198 10 467 C1 | 10/1999 |
| DE | 101 14 011 A1 | 10/2001 |
| DE | 101 27 892 A1 | 10/2003 |
| DE | 199 54 306 B4 | 9/2004 |
| JP | 8-19115 | 1/1996 |
| JP | A 08-130805 | 5/1996 |
| JP | 9-298806 | 11/1997 |
| JP | 2001-202973 | 7/2001 |
| JP | 2001-307758 | 11/2001 |
| WO | WO 01/34424 A1 | 5/2001 |

* cited by examiner

*Primary Examiner*—Edward H. Tso
(74) *Attorney, Agent, or Firm*—Oliff & Berridge, PLC

(57) ABSTRACT

An electric vehicle 10 includes a power supply apparatus 15. The power supply apparatus 15 includes a fuel cell system 22, capacitor 24 and secondary battery 26 that are connected in parallel to wiring 50. When a drive motor is performing regeneration, the capacitor 24 is collecting the regenerated electric power. The fuel cell system 22 generates electric power in accordance with the load demand. The switches 20 between the fuel cell and the wiring are closed when the load becomes small and the regenerated voltage attains a predetermined level. As a result, the generation of electric power by the fuel cell system is suspended under low-load conditions where the energy efficiency of the fuel cell system 22 is low.

24 Claims, 13 Drawing Sheets

POWER SUPPLY APPARATUS INCLUDING FUEL CELL AND CAPACITOR, AND OPERATION METHOD THEREOF

BACKGROUND OF THE INVENTION

1. Field of the Invention

The present invention pertains to a power supply apparatus that includes a fuel cell and a capacitor.

2. Description of the Related Art

A fuel cell is a possible power supply device for an electric vehicle. Drive power for the vehicle can be obtained by supplying the electric power generated by the fuel cell to the drive motor of the electric vehicle. JP 09-298806A discloses a power supply apparatus that includes a capacitor as well as a fuel cell. A capacitor is a charge accumulator that has a much higher power density than a typical secondary battery, and also has a high charging and discharging efficiency. Therefore, when a power supply apparatus with a capacitor is used, the energy efficiency of the entire system can be improved by efficiently collecting the energy obtained via motor regeneration during braking of the electric vehicle.

The output voltage of the capacitor is directly related to the amount of charge remaining therein, and the output voltage falls as the amount of remaining charge decreases. As a result, where regeneration is performed by the motor when there is little remaining charge in the capacitor, the generated electric power is quickly absorbed, and the voltage in the capacitor increases as the amount of remaining charge increases. When the motor subsequently consumes electric power, the capacitor in which the voltage increased as described above supplies electric power to the motor before the fuel cell. In this way, the amount of remaining charge in the capacitor decreases together with the voltage, and the capacitor becomes ready for the next regeneration.

Incidentally, a fuel cell system has the characteristic that its energy efficiency decreases significantly during low power output periods due to the output characteristics of the fuel cell. In other words, auxiliary devices such as pumps pertaining to the supply of fuel and air consume a predetermined amount of electric power when the fuel cell is operating, but as the amount of electricity generated drops, the percentage of electric power consumed by the auxiliary devices increases relative to the total power generation. Consequently, the energy efficiency of the fuel cell system as a whole declines during low power output periods. Accordingly, the power supply apparatus with a capacitor is desired in which not only is the electric power obtained from regeneration used efficiently, thereby improving energy efficiency, but in addition, adequate energy efficiency of the system as a whole is maintained even during low power output periods during which the efficiency of the fuel cell system declines.

SUMMARY OF THE INVENTION

Accordingly, an object of the present invention is to prevent the reduction of the energy efficiency of the power supply apparatus due to a drop in the energy efficiency of the fuel cell system.

In order to attain at least part of the above and other related objects of the present invention, there is provided a power supply apparatus that supplies electric power to a load device. The apparatus comprises a fuel cell and a capacitor that are connected in parallel to wiring for supplying electric power to the load device, and a switch that connects or disconnects the fuel cell to the wiring.

In one embodiment, the power supply apparatus is operated by: (a) obtaining a power index that reflects the amount of the electric power output by the fuel cell, and (b) on/off controlling the connection between the fuel cell and the wiring in accordance with the power index, thereby preventing reduction of a power generation efficiency of the fuel cell system. Examples of the power index include: the amount of the output power from the power supply apparatus, the amount of the output current from the fuel cell, and the size or magnitude of the load.

In another embodiment, the power supply apparatus is operated by: (a) obtaining a power index that varies along with variation of the output from the power supply apparatus, and (b) on/off controlling the connection state between the fuel cell and the wiring, thereby preventing reduction of a power generation efficiency of the fuel cell system.

The present invention can be implemented in various forms other than those described above, and may, for example, be implemented in the form of an electric vehicle that includes a power supply apparatus.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will be described below in the following order using examples.

Figure 1:
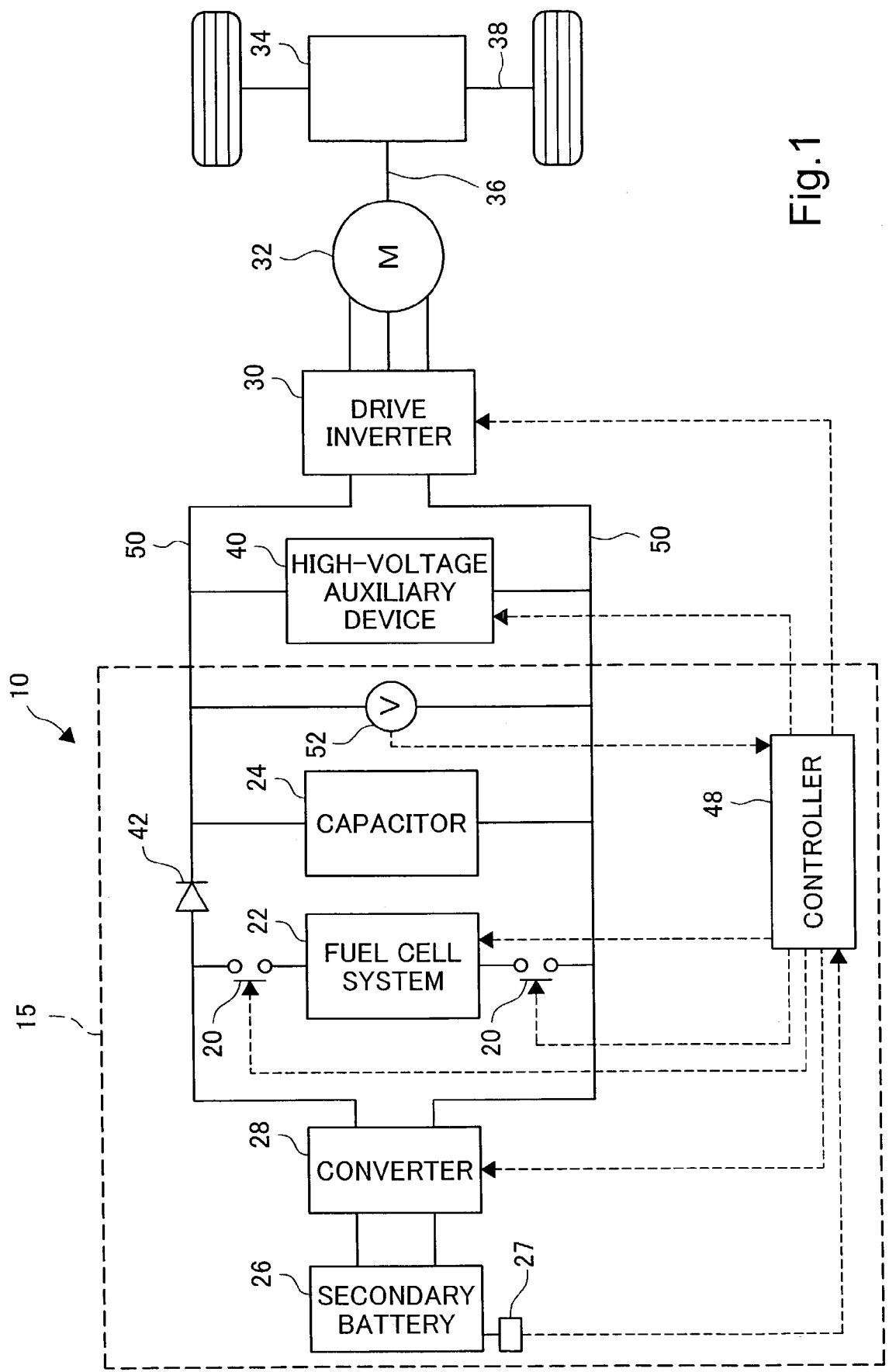
FIG. 1 is a block diagram showing the basic construction of an electric vehicle 10.

A. Overall construction of the apparatus of the first embodiment:
B. Operation in the normal operating mode:
C. Operation in the regenerative operating mode:
D. Operation in the FC suspend mode:
E. Second embodiment:
F. Third embodiment:
G. Fourth embodiment:
H. Variations:

A. Overall Construction of the Apparatus of the First Embodiment:

FIG. 1 is a block diagram showing the basic construction of an electric vehicle 10 constituting a first embodiment of the present invention. The electric vehicle 10 includes a power supply apparatus 15, and load devices to which electric power is supplied from the power supply apparatus 15. The load devices include high-voltage auxiliary devices 40 and a motor 32 that is connected to the power supply apparatus 15 via a drive inverter 30. Wiring 50 connects the power supply apparatus 15 with the load devices, and electric power is transmitted between the power supply apparatus 15 and the load devices over this wiring 50.

The power supply apparatus 15 includes a fuel cell system 22, a capacitor 24, and a secondary battery 26. The fuel cell system 22 includes a fuel cell that constitutes the main source of power generation. The fuel cell and the capacitor 24 are connected in parallel to the wiring 50. The wiring 50 is provided with various electric elements: a diode 42 for preventing reverse flow of current to the fuel cell; switches 20 for switching the state of the connection of the fuel cell to the wiring 50; a DC/DC converter 28 connected to the secondary battery 26; and a voltmeter 52 for measuring the voltage in the power supply apparatus 15.

Figure 2:
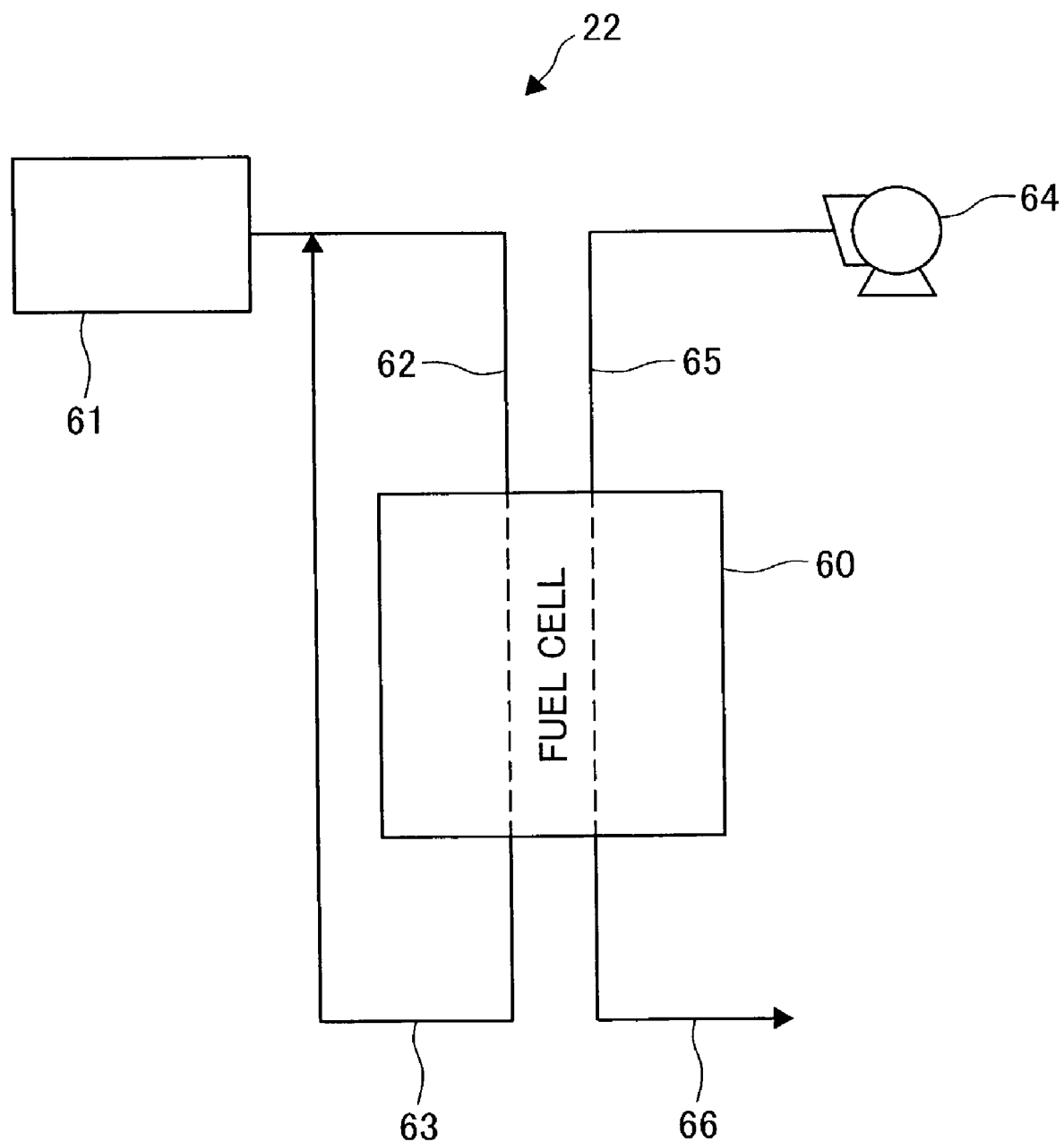
FIG. 2 shows the basic construction of a fuel system 22.

FIG. 2 shows the basic construction of the fuel cell system 22. The fuel cell system 22 includes a fuel cell 60, a fuel gas supply unit 61 and a blower 64. In this embodiment, solid high-polymer fuel cells are used in the fuel cell 60. The fuel gas supply unit 61 stores hydrogen and supplies hydrogen gas to the fuel cell 60 as fuel gas. The fuel gas supply unit 61 may include a hydrogen tank, for example. Alternatively, it may include a hydrogen storage containing a hydrogen occlusion alloy. The hydrogen gas stored in the fuel gas supply unit 61 is supplied to the anode of the fuel cell 60 for an electrochemical reaction via a fuel gas supply path 62. The remaining hydrogen gas that was not used during the electrochemical reaction is expelled to a hydrogen gas exhaust path 63. The hydrogen gas exhaust path 63 is connected to the hydrogen gas supply path 62, and supplies the remaining hydrogen gas to the electrochemical reaction once more. The compressed air taken in by the blower 64 is supplied to the cathode of the fuel cell 60 as oxidation gas via an oxidation gas supply path 65. The cathode exhaust gas expelled from the fuel cell 60 is led to a cathode exhaust gas path 66 and expelled outside the system. In the fuel cell system 22, a humidifier that humidifies the hydrogen gas or the air may be disposed in the hydrogen gas supply path 62 or the oxidation gas supply path 65.

The secondary battery 26 may be realized by various types of batteries such as a lead battery, nickel-cadmium battery, nickel-hydrogen battery, and lithium secondary battery. This secondary battery 26 supplies electric power to drive the various components of the fuel cell system 22 at the startup of the fuel cell system 22, and supplies electric power to the various load devices until the warm-up of the fuel cell system 22 is completed. Even where the fuel cell 60 generates electric power while in the normal operation state, the secondary battery 26 may supply supplemental electric power when the load exceeds a predetermined value such as the capacity of the fuel cell 60.

An SOC monitor 27 that detects the remaining capacity (State-Of-Charge, or SOC) of the secondary battery 26 is connected to the secondary battery 26. In this embodiment, the SOC monitor 27 comprises an SOC meter that integrates charge/discharge currents of the secondary battery 26 over time. Alternatively, the SOC monitor 27 may comprise a voltage sensor instead of an SOC meter. Because the secondary battery 26 has the characteristic that the voltage level falls as the SOC drops, the SOC of the secondary battery 26 can be detected by measuring the voltage level.

The DC/DC converter 28 adjusts the output voltage from the fuel cell 60 by setting a target voltage value, and thereby controls the amount of electric power generated by the fuel cell 60. The DC/DC converter 28 also functions as a switch to control the state of the connection between the secondary battery 26 and the wiring 50; the DC/DC converter 28 disconnects the secondary battery 26 from the wiring 50 when the secondary battery 26 need not be charged or discharged.

The drive motor 32 is a synchronous motor that includes a three-phase coil that forms a rotating magnetic field. This drive motor 32 is connected to the wiring 50 via the drive inverter 30, and receives electric power from the electric power apparatus 15. The drive inverter 30 is a transistor inverter that includes transistors that operate as switching elements for each phase of the motor. The output shaft 36 of the drive motor 32 is connected to the vehicle axle 38 via a reduction gear 34. The reduction gear 34 transmits the drive power output by the drive motor 32 to the vehicle axle 38 while adjusting its revolutions.

The high-voltage auxiliary devices 40 are driven by a voltage of 300V or higher that is supplied from the power supply apparatus 15 without voltage adjustment. The high-voltage auxiliary devices 40 may include, for example, the blower 64 that supplies air to the fuel cell 60 (FIG. 2), and a hydrogen pump (not shown in the figure) that circulates hydrogen gas from the hydrogen gas exhaust path 63 to the hydrogen gas supply path 62. The high-voltage auxiliary devices 40 may also include a cooling pump (not shown in the figure) that circulates coolant inside the fuel cell 60 in order to cool it down. These devices are included in the fuel cell system 22, but they are shown as high-voltage auxiliary devices 40 outside the system 22 in FIG. 1 for convenience of illustration. The high-voltage auxiliary devices 40 may include not only devices incorporated within the fuel cell system 22, but also other devices such as an air conditioning unit installed in the electric vehicle 10.

The electric vehicle 10 further includes a controller 48. The controller 48 constitutes a logic circuit incorporating a microcomputer, and more specifically, includes such components as a CPU that performs predetermined calculations based on preset control programs, a ROM on which is stored control programs and control data necessary for execution of the various calculation processes by the CPU, a RAM to which various data needed by the various CPU-executed control programs is read and written temporarily, and an I/O port that inputs or outputs various signals. The controller 48 receives detection signals from the voltmeter 52, signals output by the SOC monitor 27, and instruction signals that are input in connection with operation of the vehicle. It also outputs drive signals to the DC/DC converter 28, the switches 20, the fuel cell system 22, the drive inverter 30, and the high-voltage auxiliary devices 40.

Figure 3:
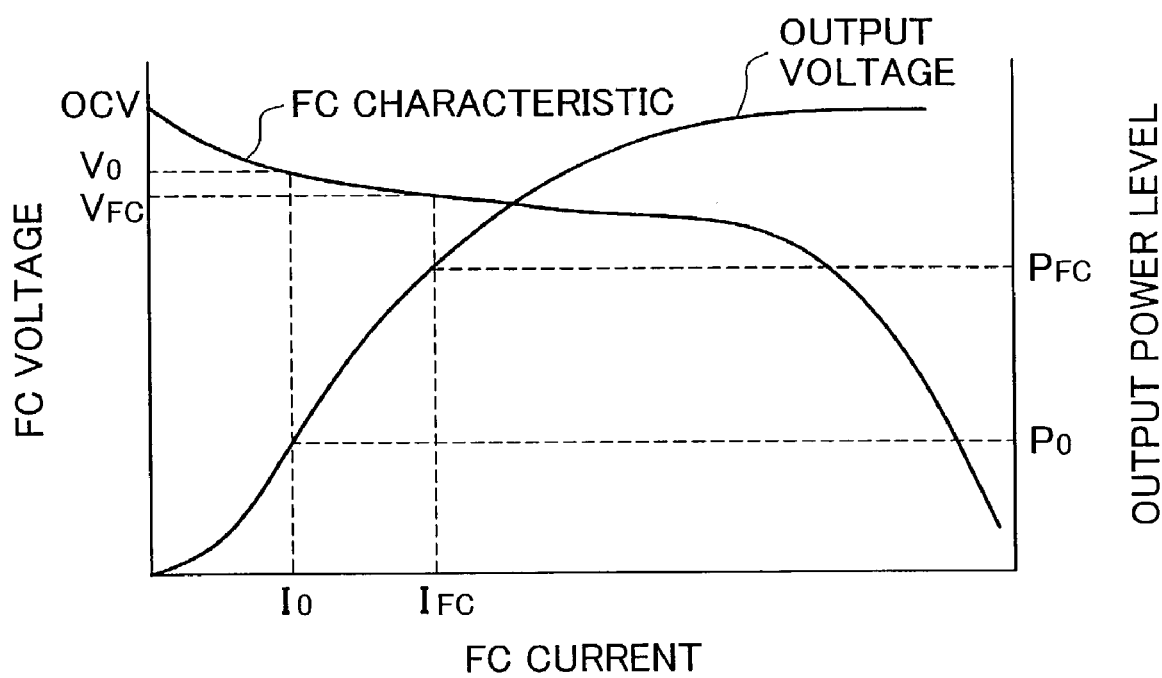
FIG. 3 shows the relationship between the output current from the fuel cell 60 with the output voltage or the output power level.

B. Operation in the Normal Operating Mode:

In the electric vehicle 10 of this embodiment, the energy needed to drive the vehicle is supplied mainly by the fuel cell system 22. The power supply apparatus 15 has three operating modes; a normal operating mode, a regenerative operating mode, and an FC suspend mode (or intermittent operating mode). In the normal operating mode, the fuel cell 60 generates electric power corresponding to the size of the load after warm-up of the fuel cell system 22 is completed. When the electric vehicle 10 is driven, the controller 48 calculates the electric power necessary to achieve a desired drive state based on the speed and an accelerator input of the vehicle. When the electric vehicle 10 is in the normal operating mode, the controller 48 calculates the electric power to be output by the fuel cell 60 based on not only the electric power needed to achieve the desired drive state, but also the electric power needed by the high-voltage auxiliary devices 40 and the SOC of the secondary battery 26. FIG. 3 shows the relationship between the output current and the output voltage or output electric power from the fuel cell 60. As shown in FIG. 3, If the electric power $P_{FC}$ to be output by the fuel cell 60 is determined, the size of the current $I_{FC}$ to be output by the fuel cell 60 for that level of electric power is also determined. Due to the output characteristics of the fuel cell 60, if the output current $I_{FC}$ is determined, the voltage $V_{FC}$ to be output by the fuel cell 60 for that level of current is also determined. The controller 48 controls the amount of electric power generated by the fuel cell 60 to the desired level by instructing the DC/DC converter 28 to attain the output voltage $V_{FC}$ derived in this manner as a target voltage. The value of the output voltage, or output electric power, relative to the output current of the fuel cell 60 as shown in FIG. 3, changes depending on the internal temperature of the fuel cell 60. Therefore, when the output voltage (target electric power level) $V_{FC}$ of the fuel cell 60 is to be determined, it is preferred that the internal temperature of the fuel cell 60 be taken into account.

In the electric vehicle 10 of this embodiment, where the size of the load equals or exceeds a predetermined upper limit and the SOC of the secondary battery 26 is sufficiently large, electric power is also supplied to the load devices by the secondary battery 26. In this case, the controller 48 determines the amount of electric power to be output by the fuel cell 60 and sets a target voltage in the DC/DC converter 28 accordingly taking into account the fact that electric power will also be supplied from the secondary battery 26. As shown in FIG. 3, the output voltage of the fuel cell 60 falls as the load and output current increase. In addition, the secondary battery 26 has the characteristic that its output voltage rises as its SOC increases. Consequently, electric power is supplied to the high-voltage auxiliary devices 40 or the drive motor 32 from the secondary battery 26 as well.

Where the SOC of the secondary battery 26 falls below a predetermined lower limit, on the other hand, it becomes necessary to charge the secondary battery 26. If the size of the load is relatively small and the fuel cell 60 has spare power to output, the secondary battery 26 is charged by the fuel cell 60. When charging the secondary battery 26, the electric power to be output by the fuel cell 60 is determined such that electric power to charge the secondary battery 26 in addition to the electric power to be supplied to the load devices can be obtained. The secondary battery 26 has the characteristic that the output voltage declines as the SOC decreases. The DC/DC converter 28 steps down the voltage of the fuel cell 60 and supply the stepped-down voltage to the secondary battery 26. Consequently, the fuel cell 60 charges the secondary battery 26 in addition to supplying electric power to the high-voltage auxiliary devices 40 and the drive motor 32.

In addition, in the electric vehicle 10 of this embodiment, when it is in the normal operating mode, the capacitor 24 is repeatedly charged and discharged. As described above, the amount of charge remaining in the capacitor 24 is directly related to the output voltage, and the output voltage increases as the SOC increases while the output voltage declines as the SOC falls. The capacitor 24 having such characteristics is connected in parallel to the wiring 50 with the fuel cell 60, as shown in FIG. 1. Consequently, where the voltage in the wiring 50 fluctuates due to fluctuations in the size of the load when the fuel cell 60 is generating electric power, the capacitor 24 is charged or discharged such that its voltage equals the voltage in the wiring 50. In other words, where the voltage in the wiring 50 rises, the capacitor 24 receives electric power from the fuel cell 60, and the SOC of the capacitor 60 is increased to the point at which the capacitor voltage equals the voltage in the wiring 50. On the other hand, where the voltage in the wiring 50 falls, the capacitor 24 supplies electric power to the load devices together with the fuel cell 60, and the SOC of the capacitor 60 is reduced to the point at which the capacitor voltage equals the voltage in the wiring 50.

C. Operation in the Regenerative Operating Mode:

In the electric vehicle 10, during braking (i.e., when the driver steps on the brake while the vehicle is running), the kinetic energy of the axle is converted into electrical energy by using the drive motor 32 as a generator, and this electrical energy is collected. The operating state in which energy is collected during braking in this fashion is termed the "regenerative operating mode". In this embodiment, the energy collected as electric power in the regenerative operating mode is absorbed by the capacitor 24. The capacitor 24 is a charge accumulator that has a much higher power density than the secondary battery 26, and also has a high charging and discharging efficiency. In other words, charging or discharging of a large amount of electric power can be performed in a short period of time. Therefore, the electric power generated via regeneration can be collected efficiently by using the capacitor 24 when the regenerative operating mode is carried out during the short period of time that the vehicle driver is applying the brake.

In the regenerative operating mode, electric power is supplied from the drive motor 32 to the wiring 50 via the drive inverter 30. In this embodiment, the voltage supplied from the drive motor 32 to the wiring 50 in the regenerative operating mode is set such that it will exceed the maximum voltage in the wiring 50 when electric power is supplied from the fuel cell 60 in the normal operating mode. Because the voltage supplied from the drive motor 32 to the wiring 50 in the regenerative operating mode is higher than the capacitor 24 voltage, charge is accumulated in the capacitor 24 through the supply of electric power. The voltage in the capacitor 24 increases as a result of this charge accumulation.

When the regenerative operating mode has ended and the electric vehicle 10 is instructed to accelerate, the supply of electric power from the fuel cell 60 to the drive motor 32 is resumed. At this time, electric power is supplied to the drive motor 32 from the capacitor 24, which accumulated charge during regeneration and now has a voltage higher than the voltage present in the wiring 50 during the normal operating mode. By using the capacitor 24 having a high power density, sufficiently high responsiveness to an increased demand for electric power can be assured, even where the load demand rises sharply, as when the vehicle accelerates. The SOC of the capacitor 24 is reduced via discharge in this way, thereby reducing the voltage in the capacitor 24, and the capacitor 24 returns to a state in which charge can be accumulated once again during the next regenerative operating mode.

D. Operation in the FC Suspend Mode:

In the electric vehicle 10 of this embodiment, when the load for which electric power is supplied from the power supply apparatus 15 is lower than a predetermined lower limit, control is performed to stop the generation of electric power by the fuel cell 60. The operating state in which the generation of electric power by the fuel cell 60 is temporarily stopped during periods of low load is termed the "FC suspend mode" or "intermittent operating mode."

Figure 4A:
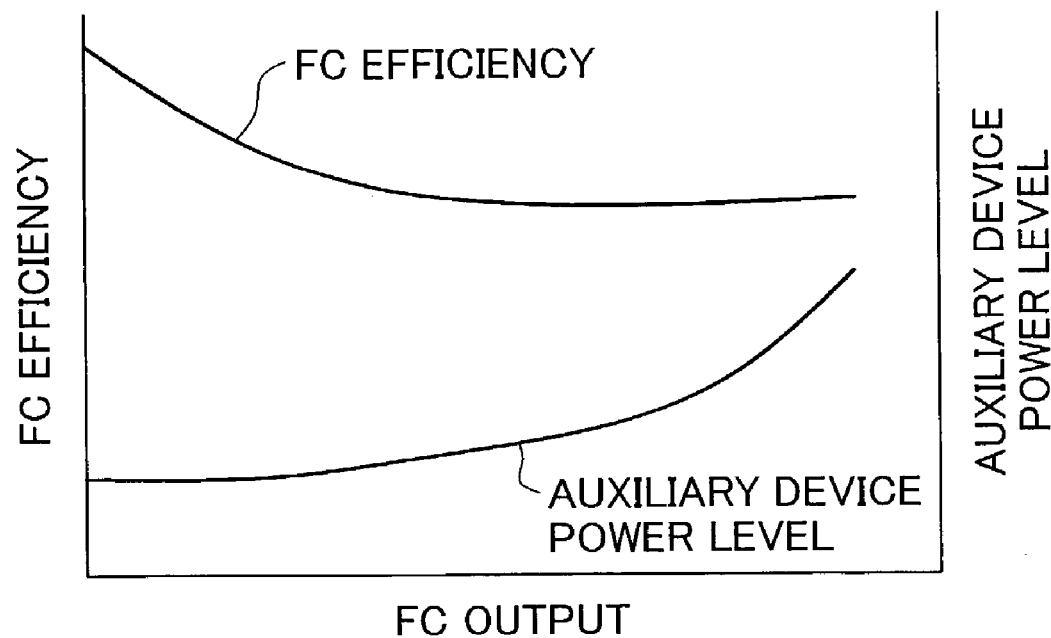
FIGS. 4(A) and 4(B) show the relationship between the level of output and the energy efficiency of the fuel cell 60.
Figure 4B:
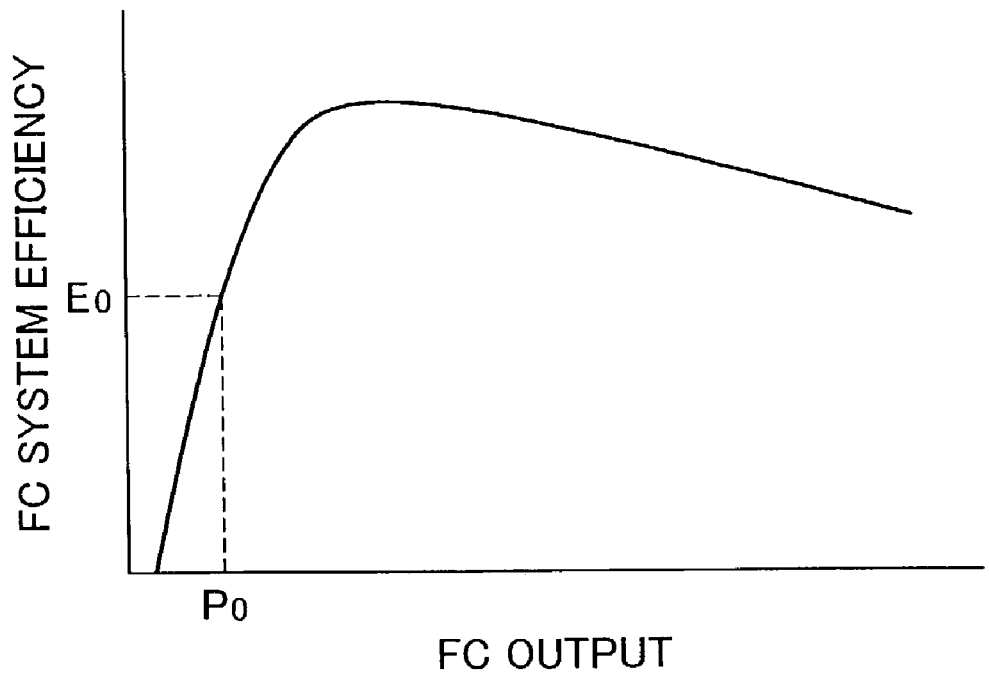

FIGS. 4(A) and 4(B) show the relationship between the output of the fuel cell 60 and energy efficiency. FIG. 4(A) shows the relationship between the efficiency of the fuel cell 60 and the drive power required by the fuel cell auxiliary devices on the one hand, and the output of the fuel cell 60 on the other. The fuel cell auxiliary devices are devices used for the generation of electric power by the fuel cell 60. For example, such devices include the blower 64, the hydrogen pump, and cooling pumps. FIG. 4(B) shows the relationship between the output from the fuel cell 60 and the efficiency of the fuel cell system 22 as a whole. As shown in FIG. 4(A), the efficiency of the fuel cell 60 declines gradually as the output from the fuel cell 60 increases. Furthermore, as the output from the fuel cell 60 increases, the auxiliary device drive power, i.e., the energy consumed in order to drive the auxiliary devices, increases as well. When the efficiency of the fuel cell system 22 as a whole is sought based on the fuel cell 60 efficiency and auxiliary device drive power shown in FIG. 4(A), the system efficiency shows a peak as illustrated in FIG. 4(B).

The amount of electric power consumed by the fuel cell auxiliary devices is usually much smaller than the amount of electric power consumed by the drive motor 32. However, when the output from the fuel cell 60 is small, the ratio of the electric power consumed by the fuel cell auxiliary devices relative to the generated electric power increases. Therefore, when the output from the fuel cell 60 is small, the energy efficiency of the fuel system 22 as a whole declines, as shown in FIG. 4(B). In the electric vehicle 10 of this embodiment, a drop in energy efficiency is prevented by adopting the FC suspend mode in which operation of the fuel cell 60 is stopped when the load is low, i.e., when the efficiency of the fuel cell system 22 as a whole is poor. In the FC suspend mode, operations of the fuel cell auxiliary devices may be suspended too.

Figure 5:
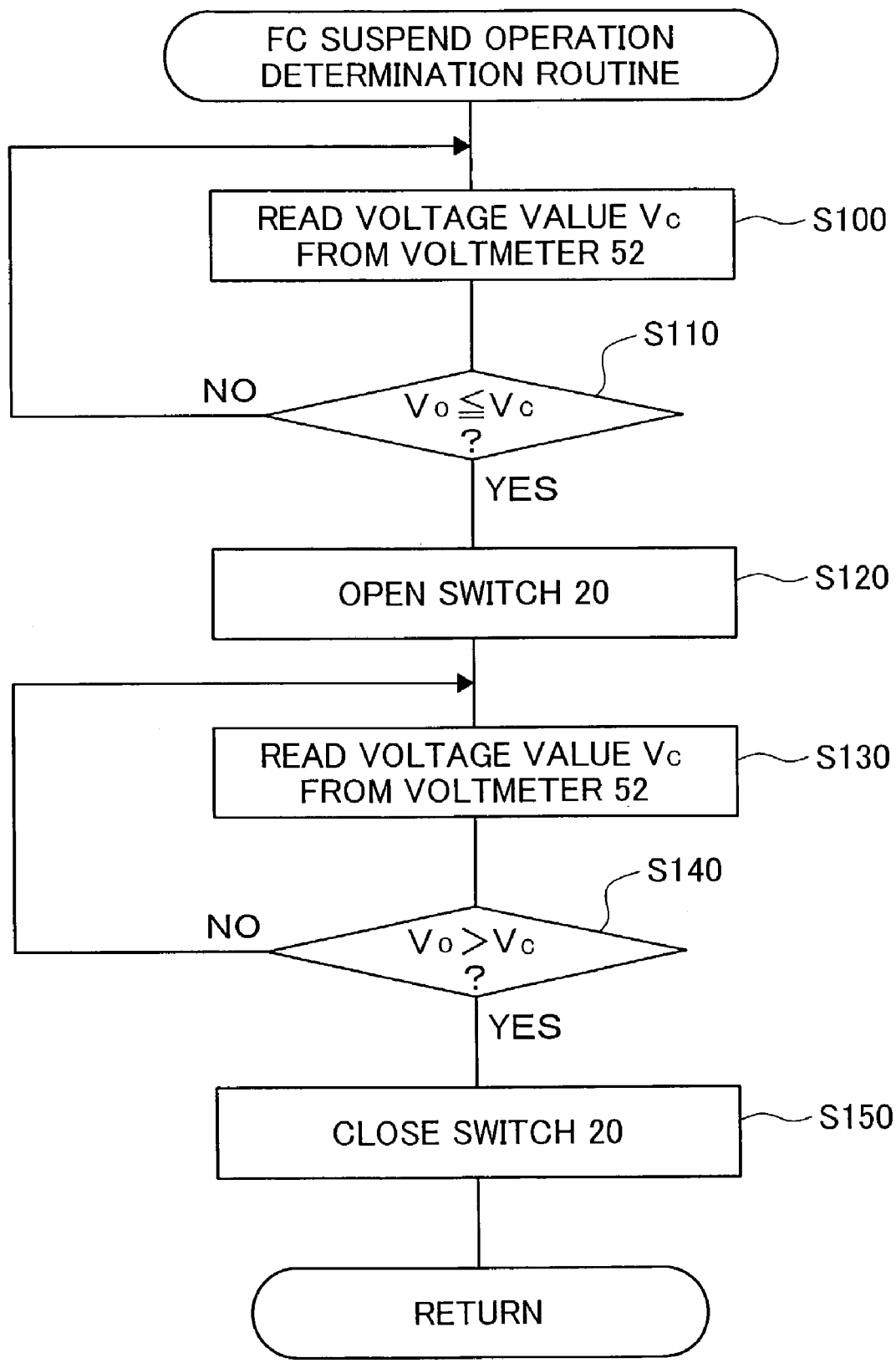
FIG. 5 is a flow chart showing the FC-suspend-operation determination routine.

FIG. 5 is a flow chart showing the FC-suspend-operation determination routine executed by the controller 48 when the electric vehicle 10 is in the normal operating mode. When this routine is executed, the controller 48 first reads the wiring 50 voltage value $V_C$ detected by the voltmeter 52 (step S100). Next, this voltage value $V_C$ is compared with a preset reference voltage value $V_0$ (step S110).

The reference voltage value $V_0$ is stored beforehand in the controller 48 as a standard for determining whether or not switching to the FC suspend mode is to be carried out. For example, the reference voltage value $V_0$ is set such that switching to the FC suspend mode is carried out when the energy efficiency of the fuel cell system 22 as a whole falls below a predetermined value $E_0$. The output $P_0$ of the fuel cell 60 when the energy efficiency of the fuel cell system 22 as a whole is $E_0$ can be sought based on FIG. 4(B). Once the fuel cell 60 output $P_0$ is determined, the output current $I_0$ of the fuel cell 60 for that output current can be sought from the relationship between the fuel cell output current and output electric power shown in FIG. 3. After the output current $I_0$ is determined, the output voltage $V_0$ for that output current can be sought based on the relationship between the fuel cell output current and output voltage shown in FIG. 3. In step S110, the reference voltage value $V_0$ sought using the above method is compared with the voltage value $V_C$ that was read in step S100.

In step S110, if the voltage value $V_C$ in the wiring 50 is smaller than the reference voltage value $V_0$, the energy efficiency of the fuel cell system 22 as a whole is determined to fall within an acceptable range, and the controller 48 returns to step S100. The operations of step S100 and step S110 are then repeated until the wiring 50 voltage value $V_C$ equals or exceeds the reference voltage value $V_0$. During this time, the electric vehicle 10 is maintained in the normal operating mode.

In step S110, when it is determined that the wiring 50 voltage value $V_C$ equals or exceeds the reference voltage value $V_0$, the controller 48 outputs a signal to the switches 20 to open it (step S120). When the switches 20 are opened in this way, the fuel cell 60 is disconnected from the load devices, and power generation by the fuel cell 60 is stopped. At the same time, operations of the fuel cell auxiliary devices are also suspended. Upon opening of the switches 20, electric power begins to be supplied to the load devices by the capacitor 24. Because the capacitor 24 has a high power density and a high charging and discharging efficiency, when the switches 20 are opened, the capacitor 24 can immediately output the electric power required by the load devices.

Figure 6:
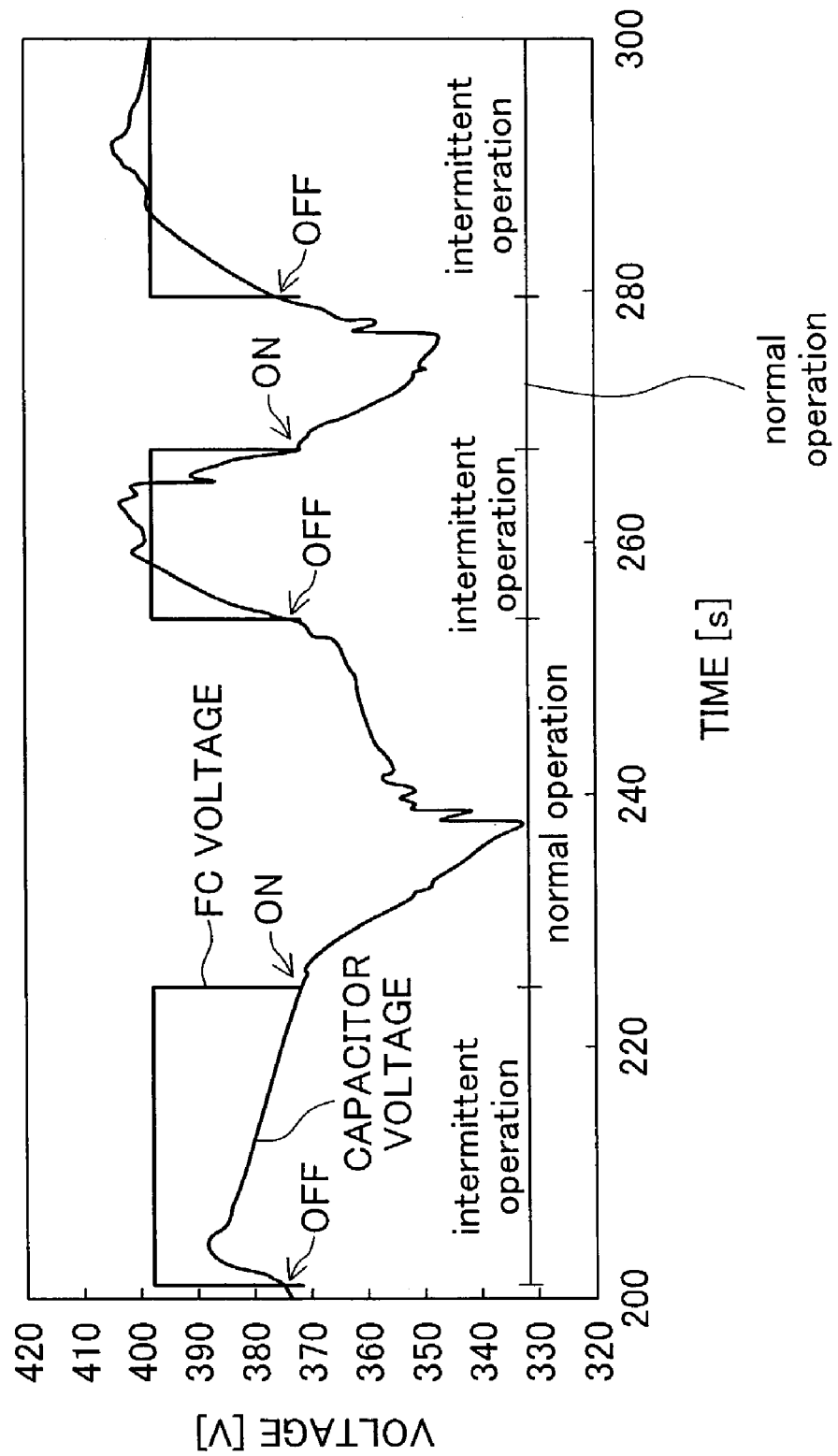
FIG. 6 shows the fuel cell 60 output voltage and the capacitor 24 voltage when the mode is switched back and forth between the normal operating mode and the intermittent operating mode.

FIG. 6 shows variations of the fuel cell 60 output voltage and the capacitor 24 voltage when the mode is switched back and forth between the normal operating mode and the FC suspend mode. Because the fuel cell 60 and the capacitor 24 are connected in parallel to the wiring 50, the two voltages are equal in the normal operating mode. The moment at which the switches 20 are opened and the operating mode is switched from the normal operating mode to the FC suspend mode in step S120 is indicated in FIG. 6 by "OFF". As shown in FIG. 6, the fuel cell 60 output voltage during the FC suspend mode is maintained higher than it is during the normal operating mode. This value represents the open-circuit voltage of the fuel cell 60. In the FC suspend mode, the capacitor 24 is discharged and its voltage falls accordingly.

When the electric vehicle 10 enters the FC suspend mode, the wiring 50 voltage value $V_C$ detected by the voltmeter 52 is read again (step S130). The voltage value $V_C$ read in step S130 is then compared with the reference voltage value $V_0$ (step S140). If the wiring 50 voltage value $V_C$ equals or exceeds the reference voltage value $V_0$ in step S140, the controller 48 returns to step S130. The operations of steps S130 and S140 are then repeated until the wiring 50 voltage value $V_C$ falls below the reference voltage value $V_0$.

If it is determined in step S140 that the wiring 50 voltage value $V_C$ is smaller than the reference voltage value $V_0$, the controller 48 outputs a drive signal to the switches 20 to close it (step S150), whereupon the routine ends. When the switches 20 are closed in this fashion, the fuel cell 60 is once again connected to the load devices and the fuel cell 60 resumes the generation of electricity. Operations of the fuel cell auxiliary devices are also resumed at the same time. As a result, the electric vehicle 10 switches from the FC suspend mode to the normal operating mode. When this switching is performed, the target voltage value is set to the reference voltage value $V_0$ in the DC/DC converter 28. As a result, when the switching is performed, the fuel cell 60 output voltage value becomes the reference voltage value $V_0$, and normal voltage control is thereafter carried out such that electric power is output in accordance with the load demand. In FIG. 6, the moment at which the operating mode switches from the FC suspend mode to the normal operating mode is indicated by "ON". When the operating mode is switched to the normal operating mode, the fuel cell 60 output voltage and the capacitor 24 voltage match once more.

There are times in FIG. 6 at which the capacitor 24 voltage rises in the FC suspend mode. This indicates that the electric vehicle 10 has entered the regenerative operating mode and the capacitor 24 is being charged. Because the fuel cell 60 output voltage is controlled by the DC/DC converter 28 in accordance with the load demand during the normal operating mode, the voltage in the fuel cell 60 and the capacitor 24 falls as the load increases.

During the FC suspend mode, electric power may be supplied to the load devices not only by the capacitor 24, but also by the secondary battery 26. Where the low-load state that calls for the FC suspend mode continues for a long period of time, or where the SOC of the secondary battery 26 is sufficiently high, the secondary battery 26 may be used in addition to the capacitor 24.

According to the power supply apparatus 15 of the first embodiment described above, regenerated electric power can be efficiently collected by the capacitor 24, and the operation of the fuel cell 60 is suspended during low-load periods in which the efficiency of the fuel cell system 22 falls to an undesirable level, by opening the switches 20, thereby improving the energy efficiency of the power supply apparatus as a whole.

In the regenerative operating mode, the capacitor 24 collects the electric power generated by the driver motor 32 very quickly, and when the operating mode switches to the normal operating mode, the capacitor 24 supplies electric power to the load devices until the capacitor 24 voltage falls to a level matching the output of the fuel cell 60. Therefore, by simply connecting the capacitor 24 to the wiring 50 in parallel with the fuel cell 60, the regenerated electric power can be efficiently used.

In the above power supply apparatus, the switches 20 can connect or disconnect the fuel cell 60 to or from the wiring 50 to effect the FC suspend mode. Similar switches may be provided to the fuel cell auxiliary devices. In the power supply apparatus 15, electric power can be supplied to the load devices during low-load periods by the secondary battery 26 in place of the fuel cell 60. However, if the capacitor 24 and the fuel cell 60 were connected in a parallel fashion without the switches 20, the fuel cell 60 would continue to output electric power in order to charge the capacitor 24. This operation of charging the capacitor 24 would be conducted while the energy efficiency of the fuel cell system 22 is low. In this case, the fuel cell 60 would continue to charge the capacitor 24 even though the supply of electric power to the load devices by the fuel cell 60 were stopped when the electric vehicle 10 entered a low-load state, the energy efficiency of the entire electric power apparatus 15 could not be improved. On the other hand, the switches 20 disconnects the fuel cell 60 from the wiring 50 during low-load periods, and the fuel cell 60 no longer generates electricity while the energy of the fuel cell system 22 is low, thereby improving the energy efficiency.

Figure 7:
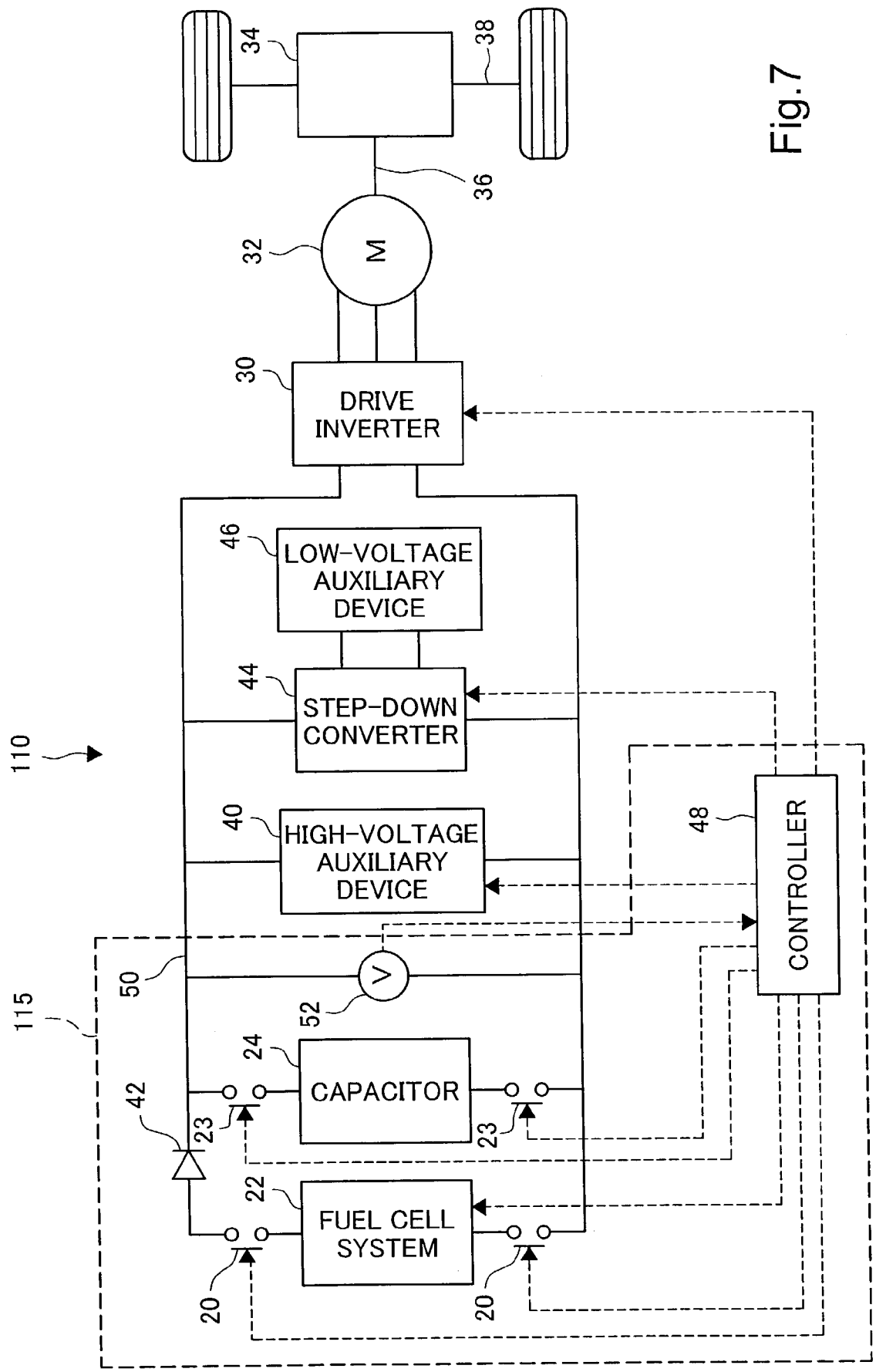
FIG. 7 is a block diagram showing the basic construction of an electric vehicle 110.

E. Electric Vehicle 110 of a Second Embodiment:

While the electric vehicle 10 of the first embodiment had a secondary battery 26, the present invention can be applied in a power supply apparatus that includes a fuel cell and a capacitor but does not include a secondary battery. FIG. 7 shows the construction of an electric vehicle 110 of a second embodiment. In FIG. 7, components common to the electric vehicle 10 shown in FIG. 1 are assigned the same symbols, and explanation thereof is omitted.

The electric vehicle 110 includes a power supply apparatus 115. The power supply apparatus 115 includes a fuel cell system 22 and a capacitor 24, but does not include a secondary battery. The electric vehicle 110 includes as load devices that receive electric power from the power supply apparatus 115 a drive motor 32, high-voltage auxiliary devices 40 and low-voltage auxiliary devices 46. The low-voltage auxiliary devices 46 include, for example, flow control valves disposed in the flow paths that supply or exhaust fuel gas, oxidation gas or coolant to and from the fuel cell 60. The low-voltage auxiliary devices 46 are connected to the wiring 50 via a step-down DC/DC converter 44. Because these low-voltage auxiliary devices 46 have a low drive voltage around 12V, unlike the drive motor 32 or the high-voltage auxiliary devices, when electric power is supplied from the power supply apparatus 115, the step-down DC/DC converter 44 reduces the voltage to the low voltage. When the wiring 50 voltage changes due to changes in the load, the controller 48 drives the step-down DC/DC converter 44 based on a detection signal from the voltmeter 52, and the voltage of the electric power supplied to the low-voltage auxiliary devices 46 is maintained at about a fixed level. The low-voltage auxiliary devices 46 and the step-down DC/DC converter 44 are omitted in the drawing of FIG. 1 of the first embodiment for convenience of illustration.

In addition, a switch 23 that alternates the state of the connection between the capacitor 24 and the wiring 50 is present in the power supply apparatus 115. This switch 23 is opened when the operation of the power supply apparatus 115 is stopped, and is closed when the power supply apparatus 115 is started. Consequently, electric charge is maintained in the capacitor 24 while the power supply 115 is not engaged. When the power supply apparatus 115 is started once again, the switch 23 is first closed to supply electric power to each load device from the capacitor 24 until operation of the fuel cell 60a is resumed enough to generate a desired amount of electric power. The switch 23 is normally closed while the power supply apparatus 115 is operating.

In this electric vehicle 110 as well, the capacitor 24 stores regenerated electric power to improve energy efficiency. Furthermore, through an operation similar to the FC-suspended-mode determination routine shown in FIG. 5, the operation can be switched to the FC suspend mode to prevent a drop in energy efficiency during low-load periods. As described above, the benefits from the employment of a capacitor and the adoption of the FC suspend mode can be enjoyed in the second embodiment in the same way as with the electric vehicle 10 of the first embodiment.

As described above, in the first and second embodiments, the timing at which the operating mode is switched from the normal operating mode to the FC suspend mode or vice versa is determined based on the power supply apparatus output voltage value detected by the voltmeter 52. This power supply apparatus output voltage value can be deemed the voltage in the capacitor 24 that is connected to the wiring 50 in parallel with another power supply device (the fuel cell 60 or the secondary battery 26) and that is kept connected to the wiring 50 during the operation of the power supply apparatus. Furthermore, the power supply apparatus output voltage can be deemed a value that reflects the level of the electric power output by the fuel cell 60 while the switch is closed. By making the determination to switch to or from the FC suspend mode based on this voltage value, the switching operation can be executed in a desirable timing.

Incidentally, in the electric vehicle 110 of the second embodiment, the amount of electric power output from the power supply apparatus 115 in the normal operating mode is the total of the electric power output by the fuel cell 60 and the amount of charge or discharge of the capacitor 24. This total represents the amount of electric power consumed by the load devices. Because the fuel cell 60 and the capacitor 24 are connected in parallel, an increase of the load causes an increase in the amount of electric power generated by the fuel cell 60, thereby decreasing the output voltage and causing the capacitor 24 to discharge. When the load decreases and the amount of electric power generated by the fuel cell 60 decreases accordingly, the output voltage increases and the capacitor 24 is supplied electric power from the fuel cell 60 as the voltage increases. As described above, the size of the load demand and the amount of output electric power from the fuel cell 60 differ by an amount that matches the amount of charge or discharge of the capacitor 24. However, the amount of charge or discharge of the capacitor 24 is determined by fluctuations in the voltage and the load at any given time, and cannot be controlled. In such a power supply apparatus 115, the voltage value detected by the voltmeter 52 directly reflects the output state of the fuel cell 60, and by relying on this voltage value, switching to and from the FC suspend mode can be carried out in a desired timing (the timing at which the fuel cell 60 output reaches the level $P_0$ shown in FIG. 4(B)).

F. Third Embodiment:

In the first and second embodiments described above, the reference voltage value $V_0$ used for the comparison with the output voltage (capacitor voltage) $V_C$ detected by the voltmeter 52 when the determination regarding opening or closing of the switches 20 was a single value, but a different configuration may be used. As a third embodiment, a control method will be described below in which different values are used as the reference voltage values employed when determining the timing for switching between the normal operating mode and the FC suspend mode. The reference voltage used for determining the timing of closing the switches 20 may be adjusted. The third embodiment will be described based on the electric vehicle 110 of the second embodiment, but it may also be applied to the first embodiment.

Figure 8:
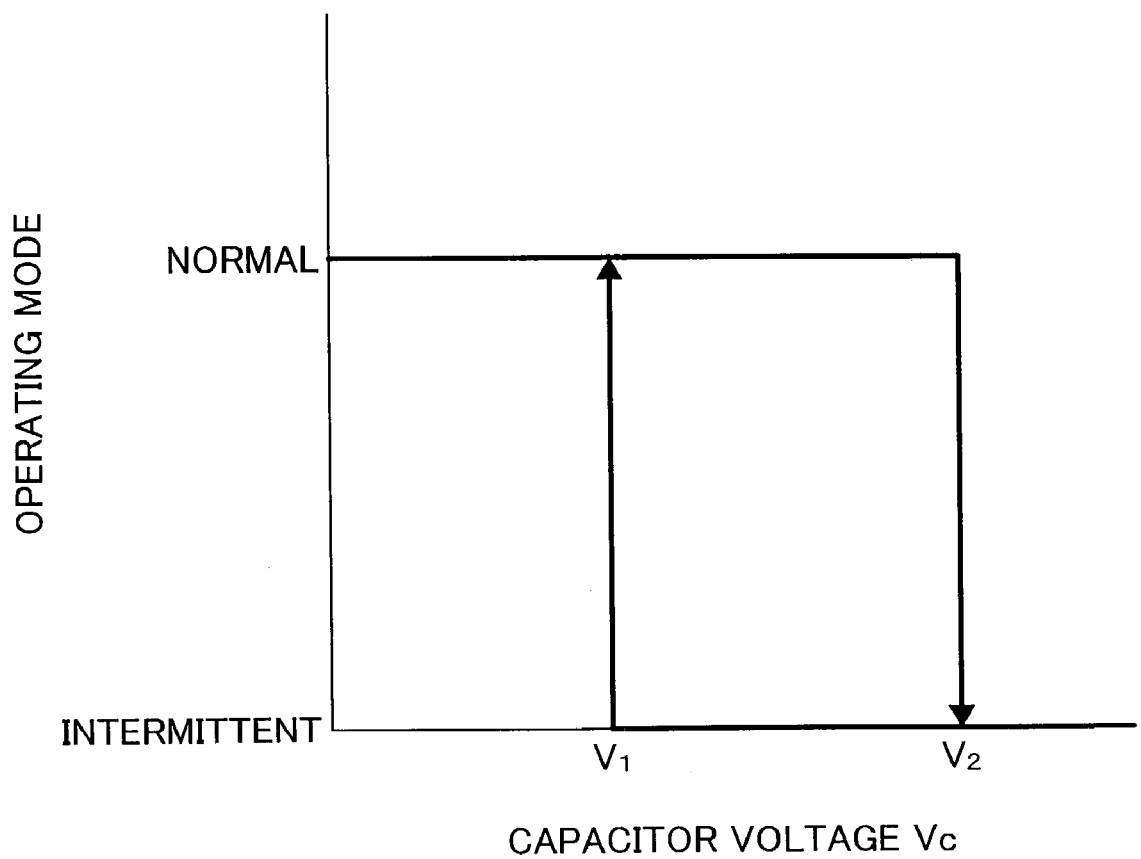
FIG. 8 shows the relationship between the capacitor voltage $V_C$ and the operating mode.

FIG. 8 shows two different reference voltages for use in the determination of switching between the intermittent driving mode and the FC suspend mode. In this embodiment, the first reference voltage $V_1$ used when the mode is to be switched from the FC suspend mode to the normal operating mode is set to be lower than the second reference voltage $V_2$ used when the mode is to be switched from the normal operating mode to the FC suspend mode. If the capacitor voltage $V_C$ detected by the voltmeter 52 falls below the first reference voltage $V_1$ during the FC suspend mode, the operating mode is switched to the normal operating mode, while if the capacitor voltage $V_C$ exceeds the second reference voltage $V_2$ during normal operating mode, the operating mode is switched to the FC suspend mode.

Figure 9:
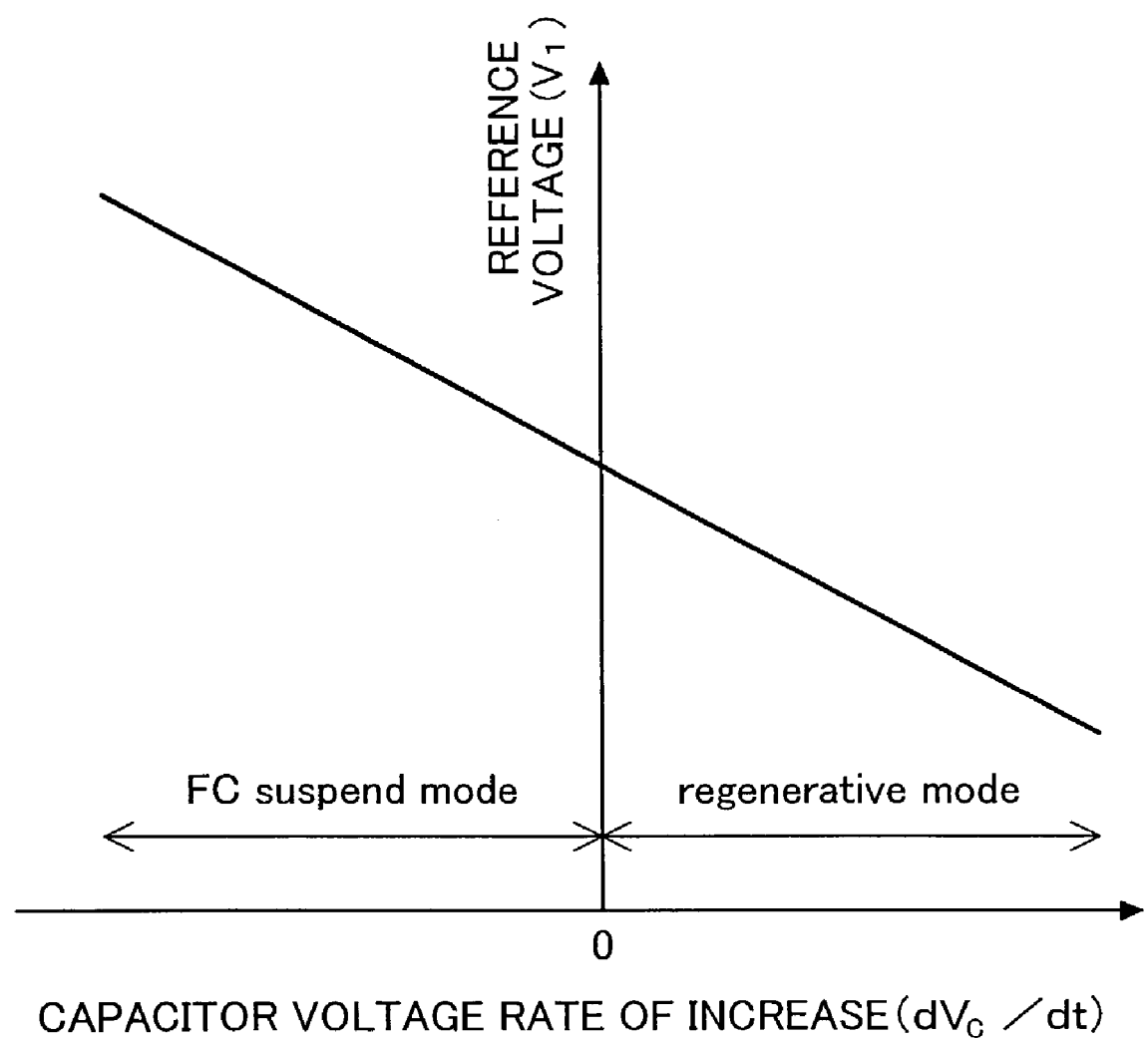
FIG. 9 shows the relationship between the capacitor voltage rate of increase ($dV_C/dt$) and a reference voltage $V_1$.

This embodiment has another feature that the first reference voltage $V_1$ that triggers a switch from the FC suspend mode to the normal operating mode is adjustable in accordance with the rate of increase in the capacitor voltage ($dV_C/dt$). FIG. 9 shows the relationship between the capacitor voltage rate of increase ($dV_C/dt$) and the first reference voltage $V_1$. In this example, the first reference voltage $V_1$ rises as the capacitor voltage rate of increase ($dV_C/dt$) falls.

Figure 10:
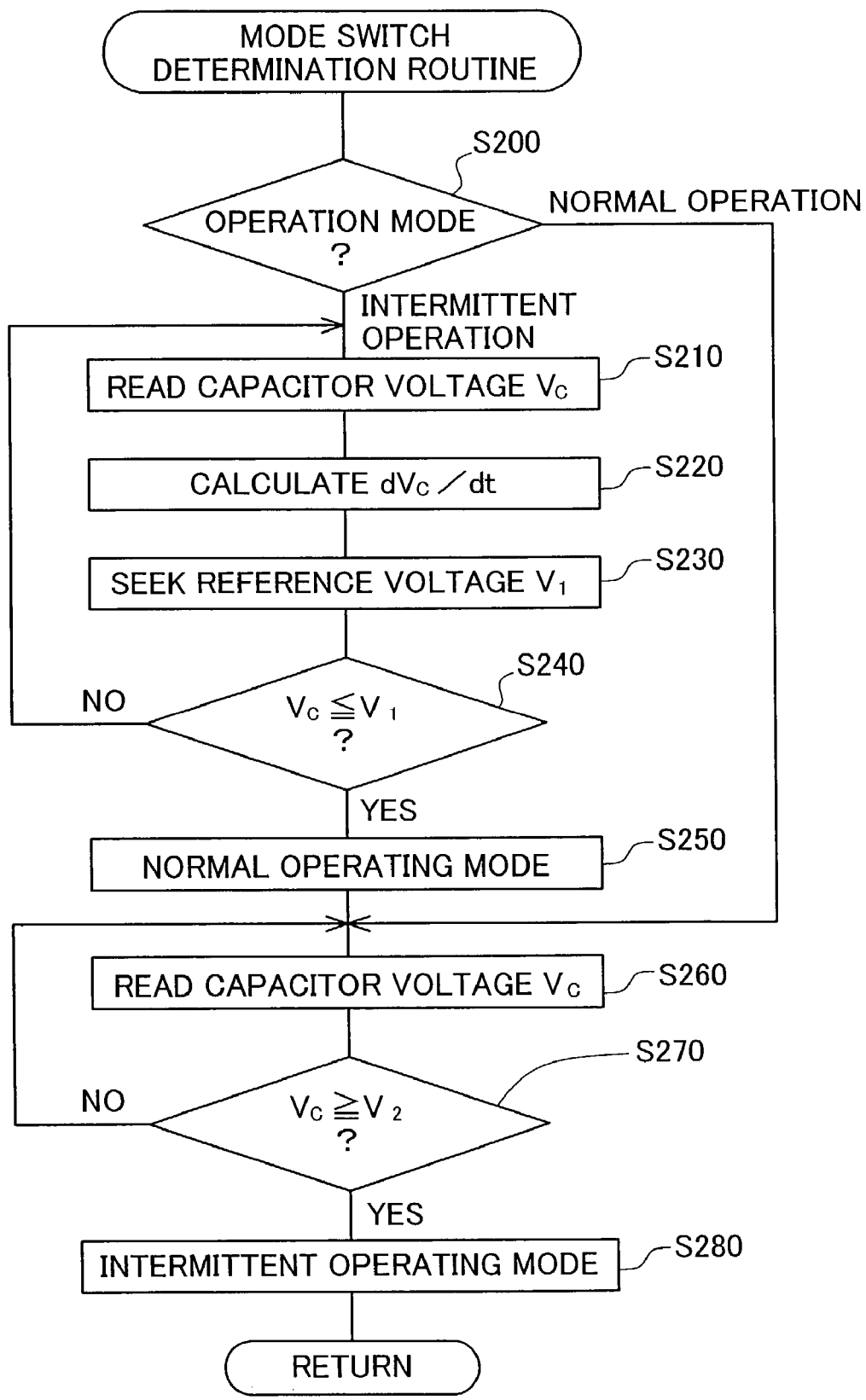
FIG. 10 is a flow chart showing the mode switch determination routine.

FIG. 10 is a flow chart showing the mode switch determination routine executed repeatedly by the controller 48 when the electric vehicle 110 is started. The controller 48 first determines the operating mode of the electric vehicle 110 (step S200). If the operating mode is determined in this step S200 to be the FC suspend mode, the capacitor voltage $V_C$ detected by the voltmeter 52 is read (step S210). The capacitor voltage rate of increase ($dV_C/dt$) is then calculated based on the read capacitor voltage $V_C$ (step S220).

In actual operation, the capacitor voltage is read more than once in step S210. For example, the capacitor voltage is read twice with an interval dt, which is sufficiently short relative to the period during which the routine is executed, allowing two voltage values $V_{C1}$ and $V_{C2}$ to be obtained. In step S220, the capacitor voltage rate of increase ($dV_C/dt$, where $dV_C=V_{C2}-V_{C1}$) is calculated based on these values.

Once the capacitor voltage rate of increase ($dV_C/dt$) is calculated, a first reference voltage $V_1$ is sought (step S230). The first reference voltage $V_1$ is sought with reference to the relationship shown in FIG. 9, based on the capacitor voltage rate of increase ($dV_C/dt$). As described above, the first reference voltage $V_1$ becomes larger as the capacitor voltage rate of increase ($dV_C/dt$) falls, i.e., as the load demand increases and the discharge from the capacitor 24 increases. Because the FC suspend mode is an operating mode in which the fuel cell system 22 is stopped and electric power is supplied from the capacitor 24, the capacitor voltage rate of increase ($dV_C/dt$) during this time is a negative value. FIG. 9 shows that the first reference voltage $V_1$ increases as the capacitor voltage rate of increase falls regardless of whether the capacitor voltage rate of increase is positive or negative. The operation to use the first reference voltage $V_1$ that is sought when the capacitor voltage rate of increase is a positive value is performed when the fuel cell is started in the regenerative operating mode, and will be described later.

When the first reference voltage $V_1$ is determined, it is compared with the capacitor voltage $V_C$ (specifically, the voltage $V_{C2}$) obtained in step S210 (step S240). In step S240, if the capacitor voltage $V_C$ is larger than the first reference voltage $V_1$, the controller 48 returns to step S210. The operations of step S210 through step S240 are thereafter repeated until the capacitor voltage $V_C$ falls to a level equal to or lower than the first reference voltage $V_1$. The electric vehicle 110 is maintained in the FC suspend mode during this period.

If it is determined in step S240 that the capacitor voltage $V_C$ is at a level equal to or lower than the first reference voltage $V_1$, the controller 48 outputs a drive signal to the switches 20 to close it, thereby switching to the normal operating mode (step S250). When this operation is carried out, a drive signal is output to all of the components of the fuel cell system 22. For example, a drive signal is output to the gas supply devices (the fuel gas supply unit 61 and the blower 64) that supply gas to the fuel cell 60, and the supply of fuel gas and oxidation gas to the fuel cell 60 is begun in order to enable it to output electric power in accordance with the load demand.

When the operating mode is switched to the normal operating mode again, the capacitor voltage $V_C$ is read once more (step S260). The capacitor voltage $V_C$ read in step S260 is then compared with the second reference voltage $V_2$ (step S270). The second reference voltage $V_2$ is stored in the controller 48 beforehand as a standard used to determine whether or not the operating mode is to be switched from the normal operating mode to the FC suspend mode. This second reference voltage $V_2$ is set such that it will always be higher than the first reference voltage $V_1$ even where the first reference voltage $V_1$ is adjusted in accordance with the capacitor voltage rate of increase ($dV_C/dt$) as described above.

In step S270, if the capacitor voltage $V_C$ is lower than the second reference voltage $V_2$, the controller 48 returns to step S260. The operations of steps S260 and 270 are then repeated until the capacitor voltage $V_C$ becomes equal to or higher than the second reference voltage $V_2$.

In step S270, if it is determined that the capacitor voltage $V_C$ is equal to or higher than the second reference voltage $V_2$, the controller 48 outputs a drive signal to the switches 20 to open it, and switches to the FC suspend mode (step S280), whereupon the routine ends. When the switches 20 are opened in this way, the connection between the fuel cell 60 and the load devices is terminated, the generation of electric power by the fuel cell 60 is stopped, and electric power is supplied to the load devices by the capacitor 24. When switching to the FC suspend mode is carried out in step S280, an instruction is also output to each component of the fuel cell system 22 to stop the supply of gas to the fuel cell 22.

If it is determined in step S200 that the operating mode is the normal operating mode, the controller 48 advances to step 260 and carries out the operations on and after step 260.

In the third embodiment, the first reference voltage $V_1$ for use in determining whether or not the operating mode is to be switched from the FC suspend mode to the normal operating mode is set such that it will increase as the capacitor voltage rate of increase ($dV_C/dt$) declines. Consequently, the faster the electric power is consumed during the FC suspend mode, the more quickly the operating mode is switched to the normal operating mode while the capacitor voltage is still sufficiently high and not excessively low. This will prevent an excessive drop in the fuel cell 60 output voltage when the mode is switched from the FC suspend mode to the normal operating mode.

When the switches 20 are closed to change the operating mode to the normal operating mode and the gas supply to the fuel cell 60 is begun, electric power is output from the fuel cell 60 in accordance with the load demand. However, where the load demand jumps suddenly, it is possible that the fuel cell 60 may suffer a temporary gas shortage, leading to a drop in fuel cell 60 output voltage to an undesirable level. One of the reasons for a gas shortage in the fuel cell 60 is that the gas supply devices that supply gas to the fuel cell 60 require a predetermined period of time to supply the desired amount of gas corresponding to its drive signal. Another reason is the occurrence of a delay between the time at which the capacitor voltage $V_C$ is detected and the time that the fuel cell 60 actually begins to generate electric power. When the operating mode is switched to the normal operating mode, the amount of gas supplied is typically determined such that the fuel cell 60 begins to generate electricity at the moment when the output voltage equals the first reference voltage $V_1$, but due to the start-up delay of the fuel cell, the capacitor voltage may further drop when the switches 20 are actually closed and the fuel cell 60 begins generating electric power. In this case, it is possible that that the fuel cell 60 will attempt to increase power generation significantly in order to supply electric power to the capacitor 24; this may reduce the output voltage of the fuel cell, leading to a gas shortage. In this embodiment, however, this problem can be prevented because the first reference voltage $V_1$ is set to increase as the capacitor voltage rate of increase declines and electric power consumption increases, and the fuel cell 60 starts up while the demand for the electric power generation by the fuel cell 60 is still low.

According to this third embodiment, the smaller the capacitor voltage rate of increase, i.e., the faster the load demand increases, the more quickly the mode is switched from the FC suspend mode to the normal operating mode (while the capacitor voltage $V_C$ is sufficiently high). As a result, switching from the FC suspend mode to the normal operating mode can be conducted while the difference between the capacitor voltage $V_C$ and the fuel cell 60 voltage (OCV=Open Circuit Voltage, see FIG. 3) is sufficiently small. Therefore, the generation of a rush current in the circuit that flows through the fuel cell 60 and the capacitor 24 when the above switching is conducted, which could damage the capacitor 24 and the switches 20, can be prevented. Similarly, damage to the fuel cell 60 due to the above voltage differential can be prevented.

In the above discussion, two values $V_{C1}$ and $V_{C2}$ were obtained in step 210 as capacitor voltage values, but it is acceptable if only one value is obtained. In this case, the capacitor voltage value obtained in step S210 when this routine is executed may be stored temporarily. The difference between the capacitor voltage newly obtained in step S210 and the stored capacitor voltage can then be deemed the capacitor voltage change amount $dV_C$ and the capacitor voltage rate of change calculated based on such amount.

Furthermore, because the second reference voltage $V_2$ for use in determining the mode change from the normal operation made to the FC suspend mode is higher than the first reference voltage $V_1$, the mode switching operation can be carried out more efficiently. In other words, the occurrence of so-called "hunching" can be prevented when the operating mode is switched. The first reference voltages $V_1$, however, may be equal to the second reference voltage $V_2$. Even in this case, the reference voltage $V_1=V_2$ may be adjusted in accordance with the capacitor voltage rate of increase with reference to FIG. 9.

In the third embodiment described above, the second reference voltage $V_2$ was a fixed value, but it may be also adjusted. If the second reference voltage $V_2$ is adjusted in accordance with the capacitor voltage rate of increase ($dV_C/dt$), it is desirable that the second reference voltage $V_2$ be always higher than the first reference voltage $V_1$ so that the occurrence of "hunching" when the operating mode is switched can be prevented.

In the third embodiment, as in the second embodiment, the operating mode switching operation was described based on the electric vehicle 110. The control to set the first reference voltage $V_1$ in accordance with the rate of increase of the capacitor voltage as described in connection with the third embodiment can also be applied with the electric vehicle 10 of the first embodiment shown in FIG. 1. The same effect obtained using the third embodiment can be obtained in this case as well. In the power supply apparatus 15 of the first embodiment, when the operating mode is switched to the normal operating mode in step S250 shown in FIG. 10, a drive signal should be output to the DC/DC converter 28 such that the output voltage therefrom will equal the reference voltage sought in step S230.

G. Fourth Embodiment:

The fourth embodiment of the present invention is related to the operation to start the fuel cell 60 in the regenerative operating mode. The regenerative operating mode is an operating mode in which, by using a drive motor as a power generating device during braking (i.e., when the driver is stepping on the brake while the vehicle is running), the kinetic energy of the vehicle is converted into electrical energy. The control in the fourth embodiment is carried out in order to prevent an excessive rise in the capacitor voltage when this electrical energy is accumulated in the capacitor. The description of the fourth embodiment below will be based on the same electric vehicle 110 used in the description of the second and third embodiments, but it is also applicable to the vehicle of the first embodiment.

Figure 11:
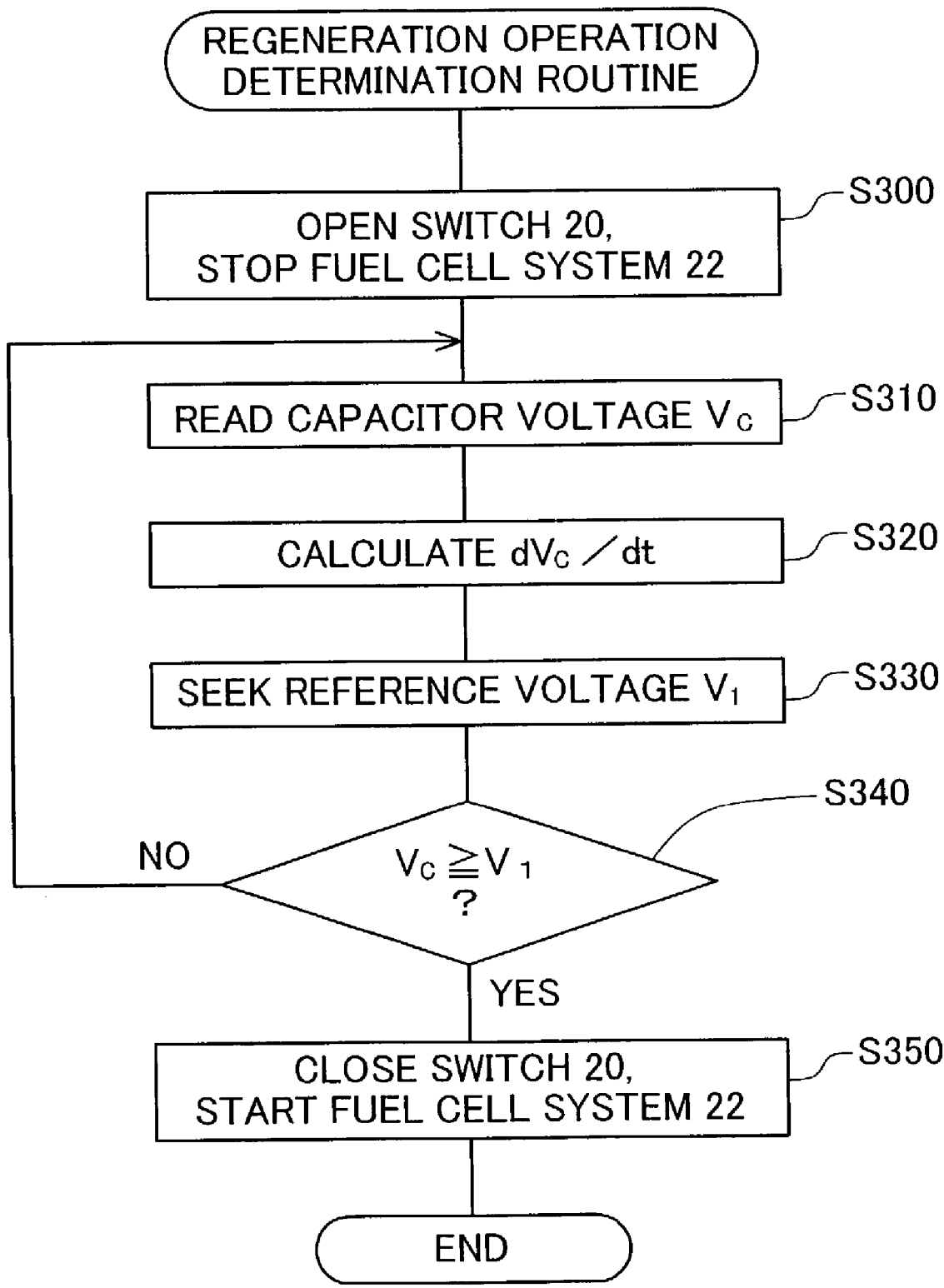
FIG. 11 is a flow chart showing the regeneration operation determination routine.

FIG. 11 is a flow chart showing the regeneration operation determination routine executed when a braking instruction is issued (i.e., when the brake is being stepped on). In the fourth embodiment, as in the third embodiment, the mode switch determination routine shown in FIG. 10 is executed repeatedly by the controller 48 while the electric vehicle 110 is starting. When a braking instruction is issued in the electric vehicle 110, the regeneration operation determination routine shown in FIG. 11 is executed by the controller 48 in lieu of the mode switch determination routine shown in FIG. 10 while this braking instruction exists.

When this routine is begun, first, the switches 20 are opened to stop the fuel cell system (step S300), and the regeneration operation is begun. If the vehicle is in the FC suspend mode when a braking instruction is issued and this routine is begun, the switches 20 are already open and the fuel cell system 22 has been stopped. Therefore, in this situation, step S300 is omitted, and the regeneration operation is begun right away. When the regeneration operation begins, the energy held in the axle of the electric vehicle 110 is collected via the drive motor 32 and the collected electrical energy is accumulated in the capacitor 24. When regeneration operation is carried out in this manner, the torque of the drive motor 32 is controlled such that the electric current waveform for the drive motor 32 will have a predetermined phase. Through this control, a charge accumulates in the capacitor 24, and the capacitor voltage rises while the regenerated voltage supplied to the wiring 50 is controlled to be always roughly equal to the capacitor voltage.

The capacitor voltage $V_C$ is then read (step S310) and the capacitor voltage rate of increase ($dV_C/dt$) is calculated (step S320). These operations are identical to the operations of steps S210 and S220 in the mode switch determination routine shown in FIG. 10. However here, because the vehicle is in the regenerative operating mode and a charge is being accumulated in the capacitor 24 via the regenerated electric power, the capacitor voltage rate of increase is a positive value. The reference voltage $V_1$ is then determined based on the capacitor voltage rate of increase calculated in step S320 with reference to the relationship between the capacitor voltage rate of increase and the reference voltage $V_1$ shown in FIG. 9 (step S330).

Once the reference voltage V1 is sought, this reference voltage $V_1$, is compared with the capacitor voltage $V_C$ obtained in step S310 (step S340). If the capacitor voltage $V_c$ is determined in step S340 to be lower than the reference voltage $V_1$, the controller 48 returns to step S310 and repeats the operations of step S310 through S340 until the capacitor voltage $V_C$ is determined in step S340 to equal or exceed the reference voltage $V_1$. During this period, the vehicle is driven in the regenerative operating mode and the capacitor 24 is charged with the electric power generated by the drive motor 32.

If the capacitor voltage $V_C$ is determined in step S340 to equal or exceed the reference voltage $V_1$, the switches 20 are closed in order to start the fuel cell system 20 (step S350), and the routine ends. In other words, the fuel cell 60 is started while the drive motor 32 performs the regeneration operation based on the braking instruction. At the same time, the gas supply devices in the fuel cell system 20 are controlled such that the electric power consumed by the fuel cell auxiliary devices such as the gas supply devices (the fuel gas supply unit 61 and the blower 64) exceeds the electric power generated by the fuel cell 60. As a result, the total electric power required by the fuel cell auxiliary devices is met by both the power generated by the fuel cell 60 and the regenerated electrical power. In other words, the electric power generated by the drive motor 32 via regeneration is consumed by the fuel cell auxiliary devices. By restricting the amount of electric power generated by the fuel cell 60 to a small amount in this way, the fuel cell output voltage and the capacitor voltage fall within a small range that is close to the OCV (Open Circuit Voltage) of the fuel cell 60, and are maintained at a high level.

When the routine ends, this operating condition is maintained until the braking instruction is no longer present (i.e., until the vehicle brake is no longer being applied). Consequently, when this routine is executed, the capacitor voltage $V_C$ is maintained in the above range that is close to the OCV of the fuel cell 60 until the braking instruction is no longer present. In addition, if the braking instruction disappears while the regeneration operation determination routine shown in FIG. 11 is being executed, the execution of such routine is ended at that moment and the controller 48 proceeds to the mode switch determination routine shown in FIG. 10.

According to the fourth embodiment, if the capacitor voltage $V_C$ exceeds the reference voltage $V_1$ during the regenerative operating mode, the fuel cell system 22 is started and the regenerated electric power is consumed by the fuel cell auxiliary devices. Consequently, a rise in the capacitor voltage $V_C$ to an undesirable level can be prevented. Here, even if a fixed value is used for the above reference voltage $V_1$, an excessive rise in the capacitor voltage $V_C$ during the regeneration operation can be prevented, but in this embodiment, the above reference voltage $V_1$ falls as the capacitor voltage rate of increases rises. As a result, the fuel cell system 22 can be started more quickly when electric power is collected suddenly via the regeneration operation, and an excessive rise in the capacitor voltage $V_C$ can be prevented more reliably.

When electric power is generated by the fuel cell 60 due to the consumption of the regenerated electric power by the fuel cell auxiliary devices, the electric power generated by the fuel cell 60 is wasted. However, because the capacitor voltage can be maintained at a high level in preparation for the next discharge, the energy efficiency of the electric vehicle 110 as a whole can be improved relative to the situation in which energy is lost when normal wheel braking is performed without the collection of energy during braking.

The operation of the fourth embodiment is also applicable to the electric vehicle 10 of the first embodiment. Where the energy obtained from the regeneration operation is accumulated in the capacitor 24 without using a secondary battery, an undesirable rise in the capacitor voltage $V_C$ can be prevented by performing the operation of the fourth embodiment.

H. Variations:

H1. Variation 1:

During the FC-suspend-operation determination routine shown in FIG. 5, the determination of whether or not to change the operating mode from the normal operating mode to the FC suspend mode was conducted based on the wiring 50 voltage, but the determination may be based on a different index or value that is related to the output power of the fuel cell. If it is based on the wiring 50 voltage as described above, switching can be performed precisely according to a desired timing, but because the fuel cell 60 output rises and falls in accordance with the load demand, the determination may be made based on the size of the load. Alternatively, the determination regarding switching from the normal operating mode to the FC suspend mode may be made based on the fuel cell 60 output current value. The FC suspend mode can be activated when the energy efficiency of the fuel cell system 22 as a whole is to fall to an undesirable level.

H2. Variation 2:

Similarly, the determination of whether or not to switch the operating mode during the mode switching determination routine shown in FIG. 10 can be made based on an index or value other than the capacitor voltage $V_C$ (i.e., the wiring 50 voltage). Furthermore, the determination of whether or not to start the fuel cell system 22 when regeneration is performed during the regeneration operation determination routine shown in FIG. 11 can be made based on an index or value other than the capacitor voltage $V_C$. The index used during such determination can be an index that is related to the change of the output of the power supply apparatus. Examples of such an index other than the capacitor voltage $V_C$ include the level of power output by the power supply apparatus 115. The level of power output by the power supply apparatus 115 may be calculated specifically from the torque command value in the drive motor 32 and the number of revolutions of the drive motor 32. In this case, the relationship between the rate of change of the output power and a reference output power level, like the relationship shown in FIG. 9, is preset, and the determination of switching the operating mode can be made based on the output power level calculated with reference to this relationship.

Furthermore, the reference value for use in the operating mode switching may be adjusted in accordance with a rate of change of an index that is different from the index which is to be compared with the reference value. For example, the reference voltage $V_1$ may be adjusted based on a rate of change of the output power level of the power supply apparatus according to their preset relationship, and the reference voltage $V_1$ may be compared with the capacitor voltage $V_C$.

H3. Variation 3:

In the FC-suspend-operation determination routine shown in FIG. 5, different values may be used for the reference voltage value $V_0$ in steps S110 and S140. The operating mode may be switched to the FC suspend mode when the load drops and the energy efficiency of the fuel cell system 22 as a whole is to fall to an undesirable level.

H4. Variation 4:

In the fourth embodiment, the switches 20 are closed to start the fuel cell system 22 when the capacitor voltage $V_C$ equals or exceeds the reference voltage $V_1$ during the regenerative operating mode, but the fuel cell system need not be started. In this case, electric power may not be generated by the fuel cell 60 while the fuel cell auxiliary devices (such as the blower 64) are started so that the regenerated electric power may be consumed by these fuel cell auxiliary devices. In other words, when the capacitor voltage $V_C$ equals or exceeds the reference voltage $V_1$, the blower 64 may be started with the switches 20 in the open state. When this occurs, the amount of electric power consumed by the blower 64 can be harmonized with the amount of electric power derived from regeneration by controlling the drive voltage of the blower 64. Where this is done, if the switch 23 is also set to the open state, the capacitor voltage $V_C$ is maintained at a level close to that of the reference voltage $V_1$. When the braking instruction is no longer present, the switch 23 can be set to the closed state and the mode switch determination routine shown in FIG. 10 can be executed.

Alternatively, if the capacitor voltage $V_C$ equals or exceeds the reference voltage $V_1$ sought with reference to FIG. 9, the regeneration operation may be stopped with the switches 20 in the open state and a normal wheel brake may be used in the electric vehicle. In this case as well, the capacitor voltage $V_C$ can be maintained at a level close to that of the reference voltage $V_1$ while the braking instruction is present.

Figure 12:
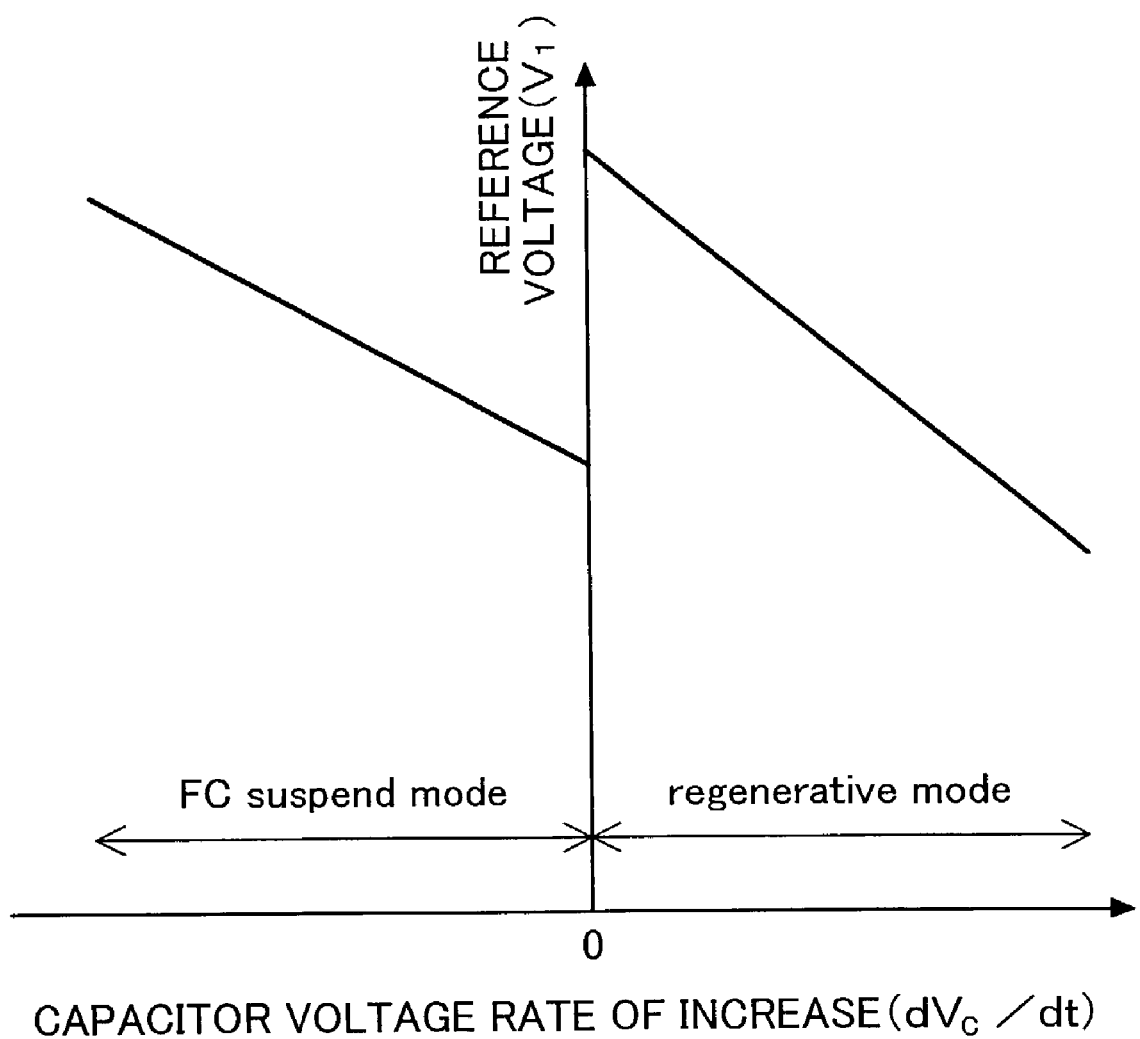
FIG. 12 shows the relationship between the capacitor voltage rate of increase ($dV_C/dt$) and the reference voltage $V_1$.

H5. Variation 5:

In FIG. 9, the reference voltage $V_1$ for use in determining to change modes from the FC suspend mode to the normal operating mode (i.e., the reference voltage $V_1$ used when the capacitor voltage rate of increase is a negative value) and the reference voltage $V_1$ for use in determining to start the fuel cell system 22 during the regenerative operating mode) are set to make a smooth line. However, the reference voltage $V_1$ used when the capacitor voltage rate of increase is a negative value and the reference voltage $V_1$ used when the capacitor voltage rate of increase is a positive value can be set to make an unsmooth line or lines. One example of this line is shown in FIG. 12. Based on FIG. 12, when the capacitor voltage rate of increase is a positive number having a relatively small absolute value, i.e., where the amount of regenerated power is relatively small, a higher value is set as the reference value $V_1$. If this construction is used, where the amount of increase in regenerated electric power is relatively small and there is little risk that the capacitor voltage will exceed its upper limit, the voltage of the capacitor 24 can be allowed to rise to a higher level before starting the fuel cell 60.

Figure 13A:
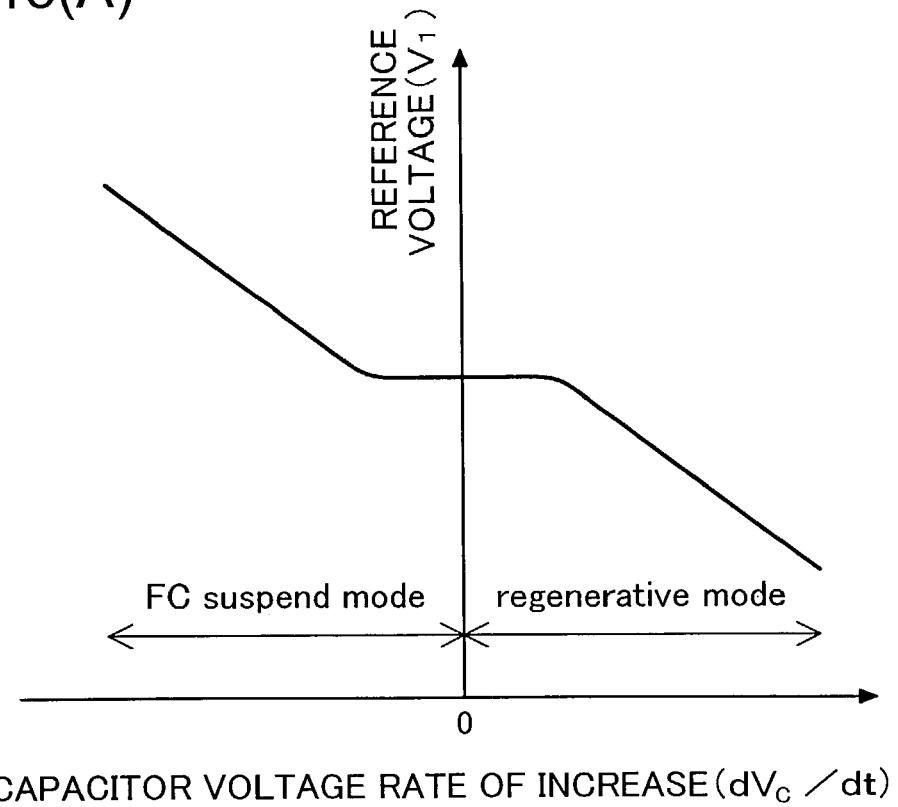
FIGS. 13(A) and 13(B) show the relationship between the capacitor voltage rate of increase ($dV_C/dt$) and the reference voltage $V_1$.
Figure 13B:
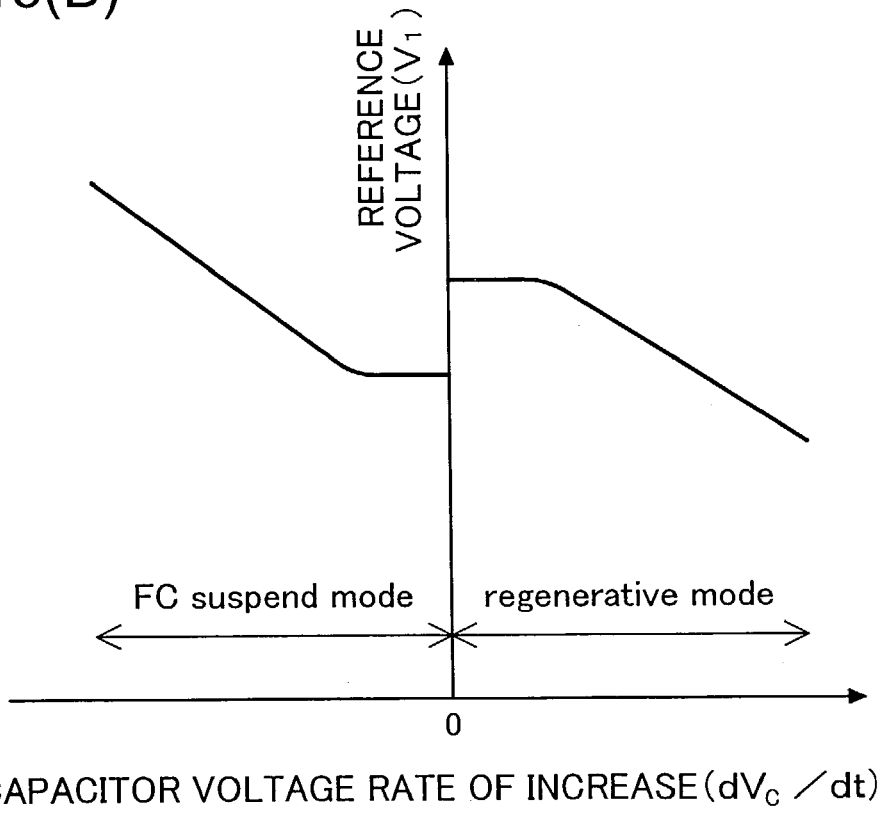

H6. Variation 6:

The relationship between the capacitor voltage rate of increase and the reference voltage $V_1$ need not vary only according to a fixed proportional rate as with the case of FIG. 9. The slope of the line may change at any point, and the relationship between the capacitor voltage rate of increase and the reference voltage $V_1$ can be set appropriately in accordance with the performance and characteristics of the various components of the electric vehicle 110, such as the capacitor 24 and the fuel cell system 22. For example, where the absolute value of the capacitor voltage rate of increase is small, the reference voltage $V_1$ may be set to a fixed value. In other words, the reference voltage $V_1$ may become larger in a monotonous way as the capacitor voltage rate of increase declines. Examples of this type of construction are shown in FIG. 13(A) and FIG. 13(B). In this case as well, the determination to switch the operating mode from the FC suspend mode to the normal operating mode can be made more quickly as the amount of electric power consumed increases. In addition, the determination to start the fuel cell system 22 while the electric vehicle 110 is in the regenerative operating mode can be made more quickly as the amount of regenerated electric power increases.

E7. Variation 7:

In the first through fourth embodiments, the switches 20 that connect and disconnect the fuel cell 60 to and from the wiring 50 are disposed at both of the terminals of the fuel cell 60, but the switch may be disposed at only one of the terminals, so long as the output from the fuel cell 60 can be stopped in the FC suspend mode.

E8. Variation 8:

In the embodiments described above, hydrogen gas is used as the fuel gas in the fuel cell system 22, but reformed gas may be used instead. In this case, the fuel gas supply unit 61 in the fuel cell system 22 shown in FIG. 2 may include a device for generating reformed gas in place of a hydrogen occlusion device. Specifically, the fuel cell system 22 can include a tank that occludes the reforming fuel and water used for the reforming reaction, a reforming apparatus that includes a reforming catalyst, and a reaction apparatus that includes a catalyst that promotes a reaction to reduce carbon monoxide in the reformed gas.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus for supplying electric power to a load, comprising:
   wiring for supplying electric power to the load;
   a fuel cell connected to the wiring,
   a capacitor connected to the wiring in parallel with the fuel cell; and
   a switch for on/off switching connection between the fuel cell and the wiring, wherein
   a first reference voltage used when a mode is to be switched from a fuel cell suspend mode to a normal operating mode is set to be equal to or lower than a second reference voltage used when the mode is to be switched from the normal operating mode to the fuel cell suspend mode.

2. A power supply apparatus according to claim 1, further comprising:
   a second battery; and
   a DC/DC converter, connected between the second battery and the wiring, for controlling an output voltage to the wiring from the second battery, the converter being connected in parallel with the fuel cell and the capacitor.

3. A power supply apparatus according to claim 1, wherein the fuel cell generate an amount of electric power corresponding to an amount of the load.

4. A power supply apparatus according to claim 3, further comprising:
   a power index obtaining section configured to obtain a power index that reflects the amount of electric power output by the fuel cel; and
   a controller configured to control the switching operation of the switch in accordance with the power index.

5. A power supply apparatus according to claim 4, wherein the power index obtaining section includes a voltmeter for detecting as the power index an output voltage from the power supply apparatus, and the controller opens the switch when the output voltage exceeds a predetermined value.

6. A power supply apparatus according to claim 4, wherein the power index obtaining section includes an ammeter for detecting as the power index an output current from the fuel cel, and the controller opens the switch when the output current falls below a predetermined value.

7. A power supply apparatus according to claim 4, wherein the power index obtaining section obtains as the power index the size of the load, and the controller opens the switch when the size of the load falls below a predetermined value.

8. A power supply apparatus according to claim 3, further comprising:
   a power index obtaining section configured to obtain a first power index that varies along with variation of the output from the power supply apparatus; and
   a controller configured to control the switch in accordance with the first power index.

9. A power supply apparatus according to claim 8, further comprising:
   a rate of change calculation section configured to calculate a rate of change in the first power index, and
   wherein the controller controls the switch in accordance with the rate of change in the first power index as well as the first power index value.

10. A power supply apparatus according to claim 8, wherein the power index obtaining section further obtains a second power index that changes, in a manner different from the first power index, along with the change of the output from the power supply apparatus,
    the power supply apparatus further comprises a rate of change calculation section configured to calculate a rate of change in the second power index, and
    wherein the controller controls the switch in accordance with the rate of change in the second power index as well as the first power index value.

11. A power supply apparatus according to claim 9, further comprising:
    a reference value setting section configured to set a first reference value that is to be compared with the first power index when the controller judges whether or not to turn the switch from open to closed, the first reference value being set such that the first reference value increases as the rate of change in the first power index decreases,
    wherein the power index obtaining section includes a voltmeter for detecting as the first power index an output voltage from the power supply apparatus, and
    when the switch is kept open and the rate of change in the first power index is a negative value, the controller closes the switch in response to a decline of the first power index below the first reference value.

12. A power supply apparatus according to claim 9, further comprising:
    a reference value setting section configured to set a first reference value that is to be compared with the first power index when the controller judges whether or not to turn the switch from open to closed, the first reference value being set such that the first reference increases as the rate of change in the first power index decreases,
    wherein the power index obtaining section includes a voltmeter for detecting as the first power index the output voltage from the power supply apparatus, and
    when the switch is kept open and the rate of change in the first power index is a positive value, the controller closes the switch in response to an increase of the first power index beyond the first reference value.

13. A power supply apparatus according to claim 11, wherein the reference value setting section sets a second reference value that is to be compared with the first power index when the controller judges whether or not to turn the switch from closed to open, the second reference value being higher than the first reference value, and, when the switch is kept closed, the controller opens the switch in response to an increase of the first power index beyond the second reference value.

14. An operation method for a power supply apparatus that includes a capacitor and a fuel cell system having a fuel cell, the capacitor and the fuel cell being connected in parallel to wiring for supplying electric power to a load, the method comprising the steps of:

(a) obtaining a power index that reflects an amount of the electric power output by the fuel cell, and (b) on/off controlling connection between the fuel cell and the wiring in accordance with the power index without affecting connection between the capacitor and the wiring, thereby preventing reduction of a power generation efficiency of the fuel cell system.

15. A power supply apparatus operation method according to claim 14, wherein the step (a) includes a step of detecting as the power index an output voltage from the power supply apparatus, and the step (b) includes a step of cutting off the connection between the fuel cell and the wiring when the output voltage exceeds a predetermined value.

16. A method according to claim 14, wherein the step (a) includes a step of detecting as the power index an output current from the fuel cell, and the step (b) includes a step of cutting off the connection between the fuel cell and the wiring when the output current falls below a predetermined value.

17. A method according to claim 14, wherein the step (a) includes a step of obtaining the size of the load as the power index, and the step (b) includes a step of cutting off the connection between the fuel cell and the wiring when the size of the load falls below a predetermined value.

18. An operation method for a power supply apparatus that includes a capacitor and a fuel cell system having fuel cell, the capacitor and the fuel cell being connected in parallel to wiring for supplying electric power to a load, the method comprising the steps of:

(a) obtaining a first power index that varies along with variation of an output from the power supply apparatus, and (b) on/off controlling connection state between the fuel cell and the wiring in accordance with the first power index without affecting connection between the capacitor and the wiring, thereby preventing reduction of a power generation efficiency of the fuel cell system.

19. A method according to claim 18, further comprising the step of: (c) calculating a rate of change in the first power index, and wherein the step (b) includes a step of on/off controlling the connection state between the fuel cell and the wiring in accordance with the rate of change of the power index as well as the power index value.

20. A method according to claim 19, further comprising the step of:

(d) setting a first reference value to be compared with the first power index when it is judged whether or not the connection state is to be changed from open to closed in the step (b), the first reference value being set such that the first reference value increases as the rate of change in the first power index decreases, and wherein the first power index is an output voltage from the power supply apparatus, and the step (b) includes a step of, when the connection state is kept open and the rate of change in the first power index is a negative value, changing the connection state from open to closed in response to a decline of the first power index below the first reference value.

21. A method according to claim 20, further comprising the step of:

(e) setting a second reference value that is to be compared with the first power index when it is judged whether or not the connection state is to be changed from closed to open in the step (b), the second reference value being higher than the first reference value, and wherein the step (b) includes a step of, when the connection is kept closed, changing the connection state from closed to open in response to an increase of the first power index beyond the second reference value.

22. A method according to claims 18, further comprising the step of:

(c) changing the connection state from open to closed in accordance with the first power index while electric power is supplied to the wiring from an outside device, thereby causing the fuel cell system to consume at least part of the supplied electric power and preventing an increase in the capacitor voltage.

23. A method according to claim 22, further comprising the steps of:

(d) calculating a rate of change in the first power index; and (e) setting a reference value to be compared with the first power index when it is judged whether or not the connection state is to be changed from open to closed in the step (c), the reference value being set such that the reference value increases as the rate of change in the first power index decreases, and wherein the first power index is an output voltage from the power supply apparatus, and the step (c) includes a step of, when the rate of change in the first power index is a positive value, changing the connection state from open to closed in response to an increase of the first power index beyond the reference value.

24. A method according to claim 14, wherein a first reference voltage used when a mode is to be switched from a fuel cell suspend mode to a normal operating mode is set to be equal to or lower than a second reference voltage used when the mode is to be switched from the normal operating mode to the fuel cell suspend mode.

* * * * *